United States Patent [19]

Uchiyama et al.

[11] Patent Number: 4,814,891
[45] Date of Patent: Mar. 21, 1989

[54] MULTICOLOR SUBLIMATION TYPE THERMAL RECORDING METHOD INCLUDING COLOR AND GRADATION CORRECTION AND DEVICE THEREFOR

[75] Inventors: Takashi Uchiyama, Tokyo; Yuji Homma, Tsurugashima; Tetsuya Sakamoto, Tokyo; Satoru Horiguchi, Tokyo; Mikizo Mizuno, Tokyo; Hiroyuki Obata, Tokyo, all of Japan

[73] Assignee: Dai Nippon Insatsu Kabushiki Kaisha, Tokyo, Japan

[21] Appl. No.: 874,648

[22] Filed: Jun. 16, 1986

[30] Foreign Application Priority Data

| Jun. 14, 1985 | [JP] | Japan | 60-129659 |
| Aug. 6, 1985 | [JP] | Japan | 60-173028 |
| Aug. 6, 1985 | [JP] | Japan | 60-173029 |
| Sep. 18, 1985 | [JP] | Japan | 60-206060 |
| Feb. 12, 1986 | [JP] | Japan | 61-28239 |
| Feb. 20, 1986 | [JP] | Japan | 61-36150 |
| Mar. 10, 1986 | [JP] | Japan | 61-52105 |

[51] Int. Cl.$^4$ .................................................. G03F 3/08
[52] U.S. Cl. ....................................... 358/296; 358/80
[58] Field of Search .................. 346/76 PH, 1.1; 358/296, 79, 80

[56] References Cited

U.S. PATENT DOCUMENTS

| 4,060,829 | 11/1977 | Sakamoto | 358/80 |
| 4,096,519 | 6/1978 | Hoffrichter et al. | 358/79 X |
| 4,468,692 | 8/1984 | Yamada et al. | 358/80 X |
| 4,549,222 | 10/1985 | Fogaroli et al. | 358/263 X |
| 4,573,071 | 2/1986 | Sakamoto | 358/80 X |
| 4,618,870 | 10/1986 | Inoue | 346/76 PH |
| 4,638,372 | 1/1987 | Leng et al. | 358/296 |
| 4,642,681 | 2/1987 | Ikeda | 358/75 X |

FOREIGN PATENT DOCUMENTS 168818 1/1986 European Pat. Off. .............. 358/80

OTHER PUBLICATIONS

B. A. Artwick, *Microcomputer Interfacing*, 1980, pp. 294–298.

Primary Examiner—Clifford C. Shaw
Attorney, Agent, or Firm—Parkhurst, Oliff & Berridge

[57] ABSTRACT

There are disclosed a method of delivering pictorial image data per each color obtained by applying color resolution to a manuscript using a color scanner to a sublimation transfer printer to effect a transfer from a sublimation transfer sheet to an image-receiving sheet, thus to make a hard copy of a color image, and a device for implementing such a method. The image data comprises three primary data of cyan, magenta and yellow and black data calculated from the three primary data. Data obtained by applying color and gradation corrections to the four color data are delivered to the sublimation transfer printer. The sublimation transfer sheet is provided with a transfer ink layer of four colors of cyan, magenta, yellow and black. By the operation of the sublimation transfer printer, the ink of each transfer ink layer is transferred onto the image-receiving paper, thus to make a hard copy.

8 Claims, 21 Drawing Sheets

F I G. 31
(a)
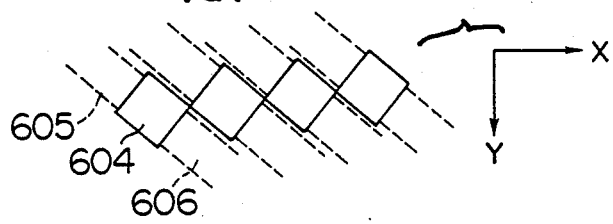
(b)
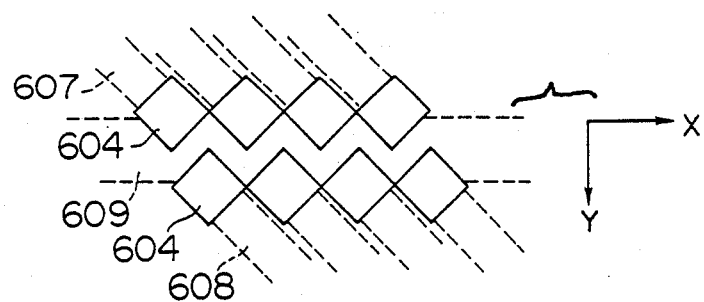
(c)
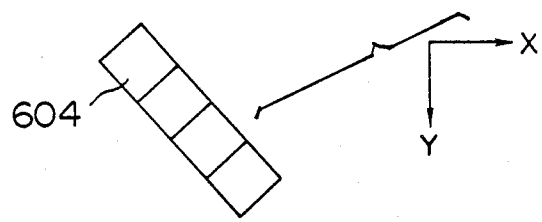
(d)
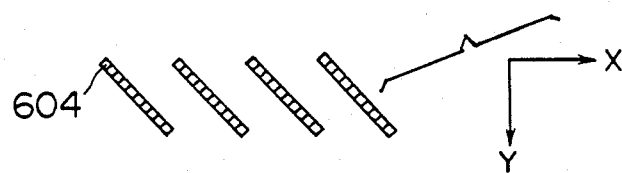

F I G. 32
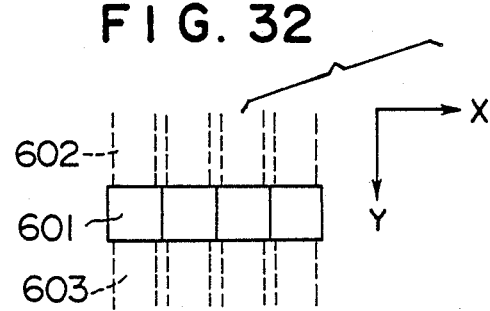
F I G. 33
(a) (b)
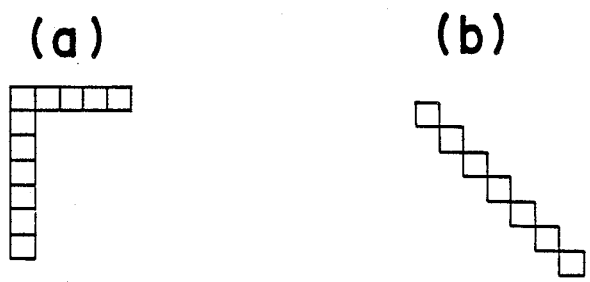
F I G. 34
(a) (b)
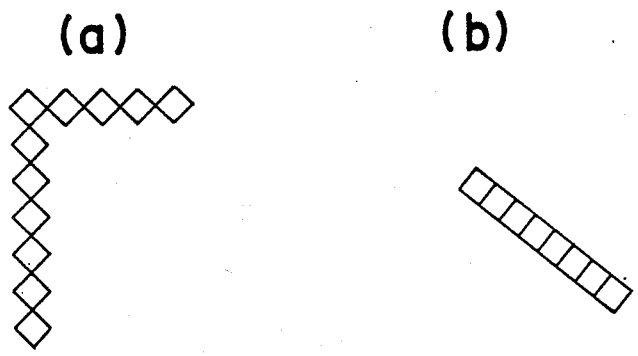

MULTICOLOR SUBLIMATION TYPE THERMAL RECORDING METHOD INCLUDING COLOR AND GRADATION CORRECTION AND DEVICE THEREFOR

BACKGROUND OF THE INVENTION

The present invention relates to a multicolor sublimation type thermal recording method for making a hard copy of a color image and a device therefor.

A method of making a hard copy of a color image is generally classified into the ink jet system and the thermal transfer system. The thermal transfer system includes the system of effecting thermal recording using a sublimation type thermosensitive transfer paper and the system of effecting thermal recording using a wax type thermosensitive transfer paper. Among these systems, the system using a sublimation type thermosensitive transfer paper can obtain a clear or distinct image as compared with other systems. Accordingly, it can be said that such a sublimation type thermal recording system is most suitable for making a high quality color hard copy.

On the other hand, for color image to be applied as the hard copy, there are various pictorial images e.g. a video image, a computer graphic image, a pictorial image, a photographic image and a print image, etc. It is possible to make hard copies of these various pictorial images on the basis of the system using the above-mentioned sublimation type thermosensitive transfer paper. Such a hard copy is made as follows. First is to make data indicative of three primary colors (which will be simply referred to as "three primary color data" hereinafter) of the above-mentioned various pictorial images to input this three original color data to a sublimation transfer printer in which the above-said sublimation type thermosensitive transfer paper is used. The sublimation transfer printer drives a thermal head on the basis of the input pictorial image data to sublimation-transfer dye contained in a transfer layer of a sublimation transfer sheet onto an image-receiving paper per each color, thus to form a color image on the image-receiving paper.

Method for inputting the three primary color data of the various pictorial images to the sublimation transfer printer is easily carried out, although they are different depending upon the kind of pictorial images. Namely, in the case of a computer graphic image, since the image is formed with three primary color data comprising R (red), G (green) and B (blue), it is possible to employ a method of directly inputting the three primary color data of R, G and B to the sublimation transfer printer. In the case of a video image, it is possible to employ a method to convert video signals forming the image into three primary color data of R, G and B or Y (yellow), M (magenta) and C (cyan) to input the three primary data to the sublimation transfer printer. Further, in the case of a pictorial image, a photographic image, or a print image, etc., it is possible to employ a method to read an image using a television camera or a scanner, etc. to input the image data thus read to the sublimation transfer printer directly or after conversion processing is applied to the image data to convert it into the three primary color data.

However, as stated above, when there is employed the method to input the three primary color data of various pictorial images to the sublimation transfer printer to simply drive a thermal head in accordance with the input data, only a poor quality image considerably different from an actual image can be obtained, thus failing to make a high precision and high quality color hard copy.

SUMMARY OF THE INVENTION

With the above in view, an object of the present invention is to provide a sublimation transfer printer which can extremely efficiently make a high precision and high quality color hard copy from various pictorial images.

To achieve this object, the present invention provides a sublimation transfer printer comprising a color corrector for correcting each of three primary color data of an input color pictorial image in conformity with the characteristic of a transfer ink and for making black data, a gradation corrector for correcting gradation of each color data output from the color corrector, a storage unit for storing each color data output from the gradation corrector, a parallel-to-serial converter for converting data read from the storage unit per each color into serial data, and a printing unit for effecting a transfer from a sublimation transfer sheet to an image-receiving paper in accordance with an output from the parallel-to-serial converter.

BRIEF DESCRIPTION OF THE DRAWINGS

FIGS. 31(a) to 31(d) are explanatory views showing a printer head used in the device according to the present invention;

FIG. 32 is an explanatory view showing a conventional dot arrangement;

FIGS. 33(a) and 33(b) are explanatory views showing a printed result obtained with a conventional head; and FIGS. 34(a) and 34(b) are explanatory views showing a printed result obtained with a head according to the present invention.

DETAILED DESCRIPTION OF PREFERRED EMBODIMENTS

The present invention will be described in connection with preferred embodiments according to the present invention with reference to attached drawings.

Figure 1:
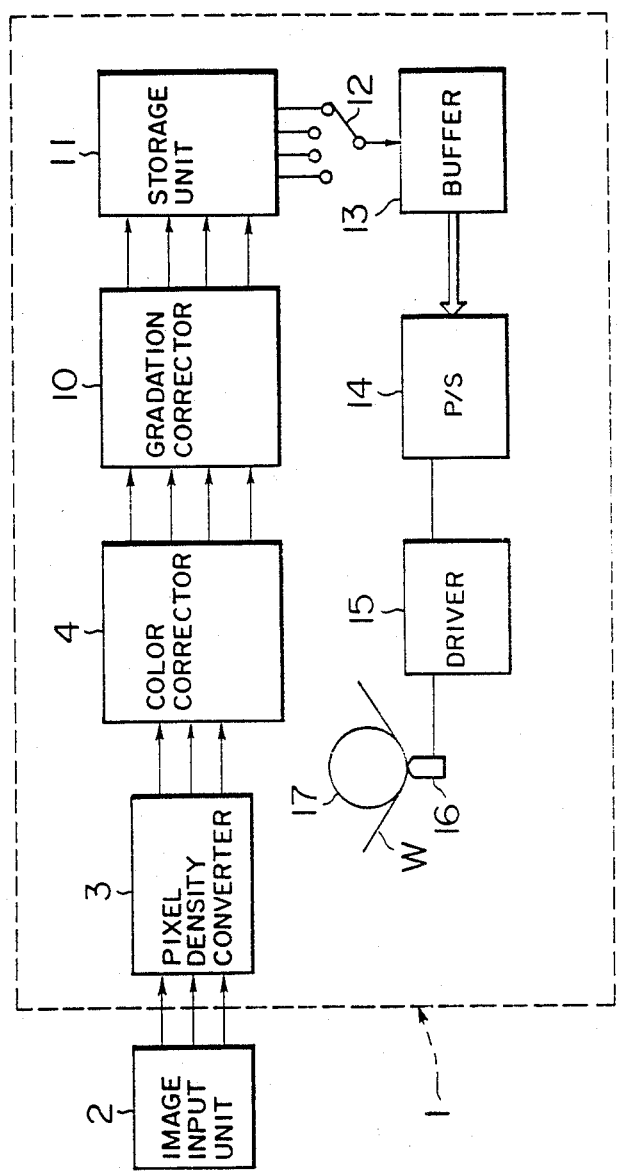
FIG. 1 is a block diagram schematically illustrating an embodiment of a sublimation transfer printer according to the present invention.

FIG. 1 is a block diagram illustrating an embodiment of a sublimation transfer printer according to the present invention. As shown in this figure, the sublimation transfer printer the entirety of which is designated at 1 is provided with a printer mechanism comprising a transfer drum 17 rotatably disposed with a transfer head 16 being in contact with the transfer drum 17 through a transfer film W. The sublimation transfer printer 1 comprises a pixel density converter 3 connected at its input side to a pictorial image input unit 2 provided outside of the printer 1, a color corrector 4 connected at its input side to the pixel density converter 3, a gradation corrector 10 connected at its input side to the color corrector 4, and a storage unit 11 connected at its input side to the gradation corrector 10. The storage unit 11 is provided at its output side with a select switch 12. To the select switch 12, a buffer 13 is connected. By operating the select switch 12, a desired data stored in the storage unit 11 is written into the buffer 13. To the output side of the buffer 13, a parallel-to-serial (P/S) converter 14 for converting parallel data into serial data is connected. Further, to the output side of the P/S converter 14, a driver 15 for driving the transfer head 16 constituting the transfer mechanism is connected.

The pictorial image input device 2 has a function to input three primary data of R, G and B or Y, M and C of the original pictorial image to the sublimation transfer printer 1. In accordance with the kind of pictorial image, a suitable one of various pictorial image input devices can be selected. For instance, where the original pictorial image is a computer graphic, since the image is formed with the three primary color data, the image input device 2 is a computer itself forming the pictorial image. Further, where the original pictorial image is a video image formed with a video signal, since it is necessary to convert a video signal into R, G and B signals, the pictorial image input device 2 comprises a VTR and an RGB decoder, etc. In addition, where the original image is a pictorial image, a photography or a printed matter, etc., since it is necessary to read the original image to form an image signal, the pictorial image input device 2 is comprised of a television camera or a scanner, etc.

The pixel density converter 3 has a function to convert pixel density picture data input from the image input device 2 into a predetermined pixel density to apply thinning or interpolation to the picture data per each color. For obtaining a high quality color hard copy, it is preferable to convert the pixel density into a pixel density of 10 lines/mm.

The color corrector 4 has a function to correct the three primary data converted into a predetermined pixel density in conformity with the characteristic of a transfer ink of the transfer film W, and a function to create ink data.

Figure 2:
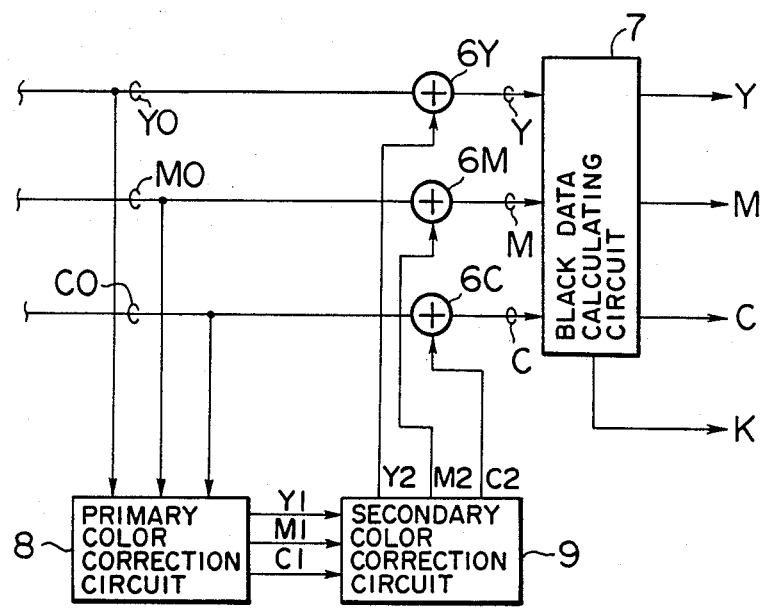
FIG. 2 is a block diagram schematically illustrating an example of a color corrector shown in FIG. 1.

FIG. 2 is a block diagram schematically illustrating an example of the color corrector 4. As shown in this figure, the color corrector 4 comprises addresses 6Y, 6M and 6C, a black data calculating circuit 7, a primary color correction circuit 8 and a secondary color correction circuit 9. The primary color correction circuit 8 functions to make a muddiness correction of the transfer ink. The secondary color correction circuit 9 functions to enable a conscious color control based on a selective correction with respect to a predetermined hue.

The gradation corrector 10 has a function to correct gradation of data of each color Y, M, C and K (black) input from the color corrector 4 according to need. The gradation corrector 10 is provided with a gradation circuit (not shown), etc., enabling emphasis of highlight or shadow.

The storage unit 11 temporarily stores data per each color output from the gradation corrector 10. By operating the select switch 12 provided at the output side of the storage unit 11, data per each color can be written into the buffer 13. Into the buffer 13 employed in this embodiment, data corresponding to one line of the transfer head 16 can be written. As previously described, the buffer 13 is connected to the P/S converter 14.

Figure 3:
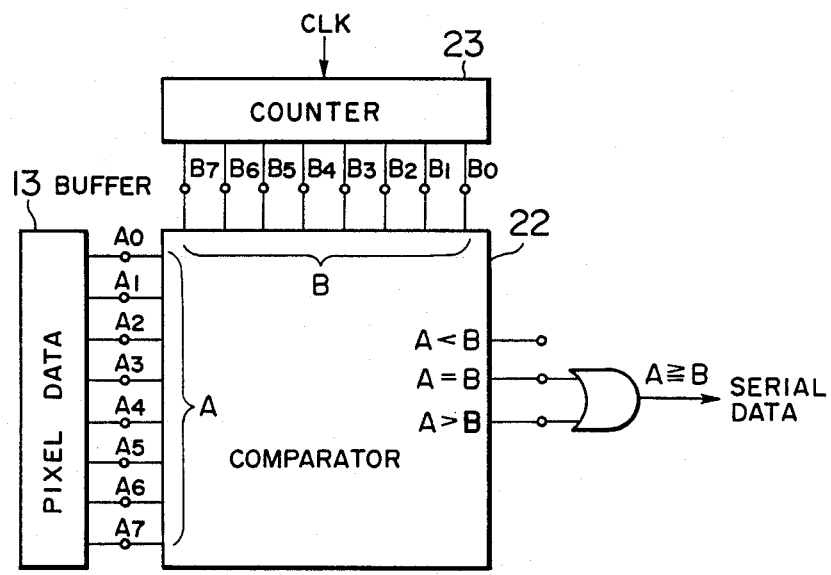
FIG. 3 is a block diagram schematically illustrating an example of a parallel-to-serial converter shown in FIG. 1.

FIG. 3 is a block diagram schematically illustrating the circuit arrangement of the P/S converter 14. As shown in this figure, the P/S converter 14 includes a comparator 22 to which two inputs labeled A and B are delivered from the buffer 13 and a counter 23, respectively. More particularly, the input A is pixel data of 8 bit configuration $A_0$ to $A_7$ delivered from the buffer 13 as parallel data. On the other hand, the input B is an input of 8 bit configuration $B_0$ to $B_7$ delivered from the counter 23 as parallel data. The comparator 22 responds to these inputs A and B to output serial data to the driver 15 (FIG. 1), thus allowing the driver 15 to drive the transfer head 16 (FIG. 1) on the basis of the serial data.

Figure 4:
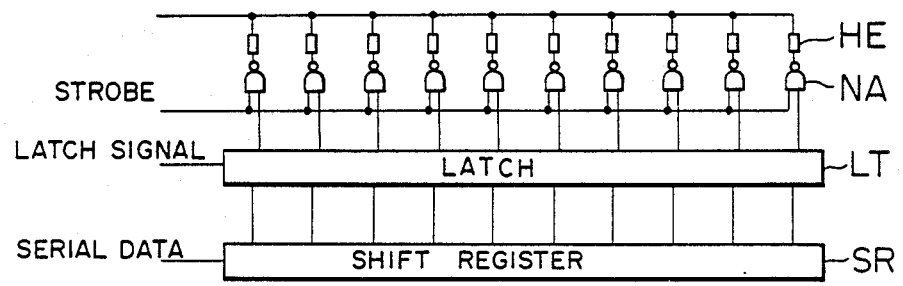
FIG. 4 is a circuit diagram illustrating the detailed circuit configuration of a transfer head shown in FIG. 1.

FIG. 4 is a circuit diagram showing the detail of the transfer head 16. As shown in this figure, a shift register SR operates in response to serial data delivered thereto to produce parallel outputs. These parallel outputs are latched by a latch circuit LT. The latched outputs are delivered to one input terminals of NAND gates NA, respectively. When a strobe signal is input to respective the other input terminals of the NAND gates NA, the above-mentioned latched outputs are delivered to heat elements HE, respectively.

Figure 5:
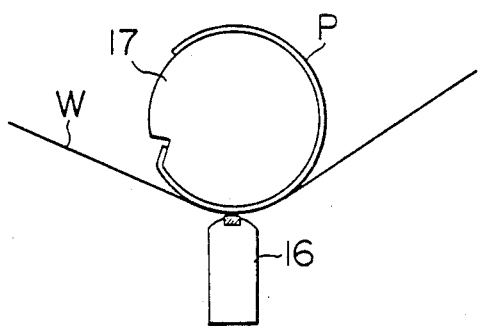
FIGS. 5 and 6 are schematic views illustrating a transfer mechanism comprising in combination the transfer head and a transfer drum shown in FIG. 1, wherein an image is transferred onto an image-receiving paper using the transfer mechanism.
Figure 6:
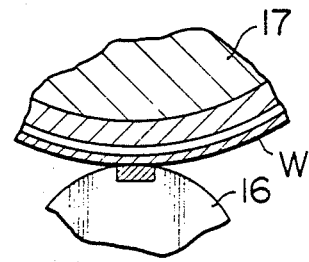

FIGS. 5 and 6 illustrate a transfer mechanism comprising the transfer head 16 and the transfer drum 17 wherein an image is transferred onto an image-receiving paper using the transfer mechanism. Onto the peripheral surface of the transfer drum 17, an image-receiving paper P is wound. The transfer head 16 is in contact with a predetermined position of the transfer drum 17 through the transfer film W, thereby to heat and sublime dye of the transfer film W to adhere it onto the image-receiving paper P.

Figure 7:
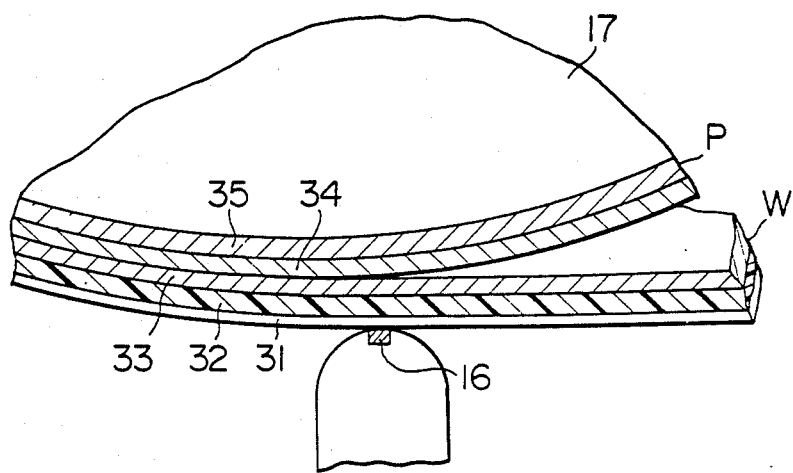
FIG. 7 is a partially enlarged view of FIG. 6.

FIG. 7, which is a partial enlarged view of FIG. 6, shows that the transfer head 16 is in contact with the transfer drum 17 through the transfer film W and the image-receiving paper P. The transfer film W comprises a heat-resisting layer 31, a base material 32 and a transfer layer 33 which are stacked in succession On the other hand, the image-receiving paper P comprises an image-receiving layer 34 and a base material 35 stacked thereon.

For the heat-resisting layer of the transfer film W, there have been proposed a method of providing a metallic layer or a silicon oxide layer as an antiwearing layer on the back surface of a base (Japanese patent publications Tokkaisho No. 54-143152 and Tokkaisho No. 57-74195), a method of providing a heat resisting resin layer such as silicon or epoxy (Japanese patent publication Tokkaisho No. 57-7467), a method of providing a resin layer to which a surface activating agent of solid or semi-solid at an ordinary temperature is added (Japanese patent publication Tokkaisho No. 57-12978), or a method of providing a layer formed by containing a lubricating nonorganic pigment in a heat-resisting resin.

For the base material 32, a film e.g. a polyester film, a polystyrene film, a polysulfon film, a polyvinyl alcohol film or a cellophane, etc. may be used. Particularly, from a viewpoint of heat-resisting property, a polyester film is preferable. It is desirable that its thickness is 0.5 to 50 $\mu$m, preferably 3 to 10 $\mu$m.

The thermal transfer layer 33 is configured as a thermal sublimation transfer layer in which a dye having sublimation property is contained in a binder resin. It is desirable that its thickness is 0.2 to 0.5 $\mu$m, preferably 0.4 to 2.0 $\mu$m. It is desirable to use a dispersion dye as the dye contained in the transfer layer 33. Further, it is desirable that the dispersion dye has a molecular weight of about 150 to 400. Such a dye is selected by taking into account thermal sublimation temperature, hue, a weather-worthiness, stability in a binder resin, and the like. For example, available dyes are Miketon Polyester Yellow-YL (C. I. Disperse Yellow-42 by Mitsui Tohsho Co., Ltd.), Kayaset Yellow-G (C. I. Disperse Yellow-77 by Nippon Kayaku Co., Ltd ), PTY-52 (C. I. Solvent Yellow 14-1 by Mitsubishi Kasei Co., Ltd.), Miketon Polyester Red B-SF (C.I. Disperse Red 111 by Mitsui Tohsho Co., Ltd.), Kayaset Red B (C. I. Disperse Red B by Nippon Kayaku Co., Ltd.), PTR-54 (C. I. Disperse Red 50 by Mitsubishi Kasei Co., Ltd.), Miketon Polyester Blue FBL (C. I. Disperse Blue 56 by Mitsui Tohsho Co., Ltd.), PTB-67 (C. I. Disperse Blue 241 by Mitsubishi Kasei Co., Ltd.), and Kayaset Blue 906 (C. I. Solvent 112 by Nippon Kasei Co., Ltd.), etc.

Dye exists ordinarily by 5 to 70 weight percent, preferably by 10 to 60 weight percent in a transfer layer, although depending upon sublimation of the dye and the magnitude of covering force in a colored condition.

For the binder resin, materials which ordinarily have high heat-resisting property and do not prevent transfer of the dye when heated are selected. For instance, such materials are listed below.

(1) Cellulose system resin

Ethyl cellulose, hydroxy ethyl cellulose, ethyl hydroxy cellulose, hydroxy propyl cellulose, methyl cellulose, cellulose acetate, cellulose acetic acid, etc.

(2) Vinyl system resin

Polyvinyl alcohol, polyvinyl acetate,. polyvinyl butyral, polyvinyl pyrrolidone, polyester, and poly acrylic amide, etc.

For providing such a thermal transfer layer 33 on the base material 32, a method is employed to dilute dye and binder resin into a solvent or dilute binder resin with dye being dispersed to produce an ink composite for forming sublimation transfer layer to provide the ink composite material on the base material 32 using a suitable printing method or a painting method. According to need, an arbitrary additive may be added to the ink composite for forming sublimation transfer layer On the other hand, for the image-receiving paper P, paper, synthetic paper, woven cloth, unwoven cloth, plastic film or sheet, compound material in which plastic film, paper and metallic foil are arbitrarily combined, or metallic plate or wood may be suitably selected according to use.

The image-receiving paper P shown in FIG. 7 is of structure comprising the image-receiving layer 34 provided on the base material 35. However, the image-receiving paper P may be formed with only the base material 34. The image-receiving layer 34 may be provided according to need.

In addition, available resins constituting the image-receiving layer are listed below.

(a) Resin having ester coupling

Polyester resin, polyacrylic ester resin, polycarbonate resin, polyvinyl acetate resin, styrene acrylate resin, or vinyl toluene acrylate resin (b) Resin having urethane coupling Polyurethane resin, etc.

(c) Resin having amide coupling

Polyamide resin, etc.

(d) Resin urea coupling

Urea resin, etc.

(e) Other resins having high polar coupling

Polycaprolactone resin, styrene-maleic anhydride resin, polyvinyl chloride resin, polyacrylonitrile, etc.

In addition to the above-mentioned synthetic resins, mixture or copolymer thereof may be used.

Then, the operation of the sublimation transfer printer 1 shown in FIG. 1 will be described.

When three primary color data of an original image are input from the pictorial image input device 2 to the pixel density converter 3, the pixel density converter 3 converts the three primary color data into data having a predetermined pixel density to input the data thus obtained to the color corrector 4. In this instance, the three primary color data represented by density signals are input to the color corrector 4. In this embodiment, data Y0 of yellow, data M0 of magenta and data C0 of cyan are input.

The data Y0, M0 and C0 input to the color corrector 4 are input to the black data calculating circuit 7 through adders 6Y, 6M and 6C as shown in FIG. 2. In this black data calculating circuit 7, black data K is calculated using the expression K=min (Y, M, C) where min represents a function giving minimum value and the black data K thus calculated is output.

On the other hand, the data Y0, M0 and C0 from the pixel density converter 3 is input to the primary color correction circuit 8. Thus, primary correction data Y1, M1 and C1 are calculated. Then, these primary correction data Y1, M1 and C1 are input to the secondary correction circuit 9. Thus, secondary correction data Y2, M2 and C2 are calculated. Then, these secondary correction data Y2, M2 and C2 are delivered to the adders 6Y, 6M and 6C. Thus, they are added to corresponding data Y0, M0 and C0, respectively, thereby to produce data Y, M and C. After the black data K is calculated by the black data calculating circuit 7, the above-mentioned data Y, M and C are input to the gradation corrector 10.

The primary color correction circuit 8 functions to calculate primary correction data Y1, M1 and C1 necessary for muddiness correction of the transfer ink. The primary color correction circuit 8 applies matrix operation expressed by the following equations to the original data Y0, M0 and C0 to calculate primary correction data Y1, M1 and C1, $$Y1 = -K_{11} \cdot C0 - K_{12} \cdot M0 + K_{12} \cdot Y0,$$

$$M1 = -K_{21} \cdot C0 + K_{22} \cdot M0 - K_{23} \cdot Y0, \text{ and}$$

$$C1 = K_{31} \cdot C0 - K_{32} \cdot M0 - K_{33} \cdot Y0,$$

where $K_{ij}$ represents a weighting coefficient i=1 to 3 and j=1 to 3.

To enable the conscious color control based on a selective correction with respect to a particular hue, the secondary color correction circuit 9 functions to calculate the secondary correction data Y2, M2 and C2. By applying matrix operation to the primary correction data as indicated by the following equations, the secondary correction data Y2, M2 and C2 are calculated.

$$Y2 = Y1 + l_{11} \cdot \Delta B + l_{12} \cdot \Delta C + l_{13} \cdot \Delta G + l_{14} \cdot \Delta Y + l_{15} \cdot \Delta R + l_{16} \cdot \Delta M$$

$$M2 = M1 + l_{21} \cdot \Delta B + l_{22} \cdot \Delta C + l_{23} \cdot \Delta G + l_{24} \cdot \Delta Y + l_{25} \cdot \Delta R + l_{26} \cdot \Delta M$$

$$C2 = C1 + l_{31} \cdot \Delta B + l_{32} \cdot \Delta C + l_{33} \Delta G + l_{34} \cdot \Delta Y + l_{35} \cdot \Delta R + l_{36} \cdot \Delta M$$

where $l_{ij}$ represents weighting coefficient i=1 to 3, j=1 to 6, and $\Delta B$, $\Delta C$, $\Delta G$, $\Delta Y$, $\Delta R$ and $\Delta M$ represent particular color data.

Accordingly, by adding the secondary correction data Y2, M2 and C2 to the original data Y0, M0 and C0 in the adders 6Y, 6M and 6C, respectively, and selecting the weighting coefficient $K_{ij}$ given by the primary color correction circuit 8, it is possible to arbitrarily correct deviation from the ideal color of the ink on the image printed by the sublimation transfer printer 1. Further, by selecting the weighting coefficient $l_{ij}$ given by the secondary correction circuit 9, it is possible to arbitrarily correct the condition of the color of the image printed.

In addition, an operation may be applied to the black data K to calculate the correction data K2 using the following equation to add the correction data K2 thus calculated to the black data K, thus enabling correction of the black data K, $$K2 = K + m1 \cdot \Delta B + m2 \cdot \Delta C + m3 \cdot \Delta G + m4 \cdot \Delta Y + m5 \cdot \Delta R + m6 \cdot \Delta M$$

where M1 represents a weighting coefficient and i=1 to 6.

Thus, the data Y, M, C and K output from the color corrector 4 are input to the gradation corrector 10 and then undergo correction of the gradation per each data thereat.

Figure 8:
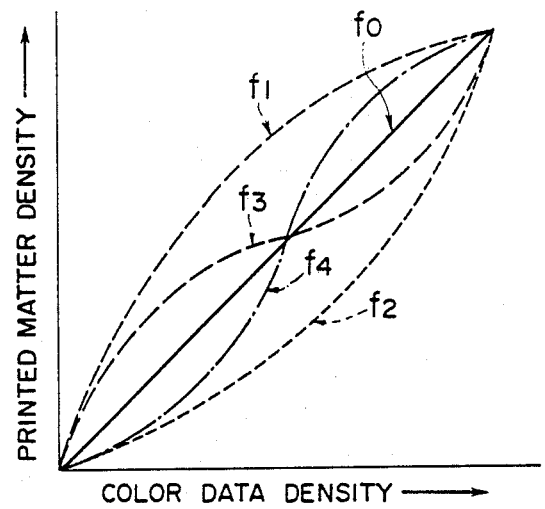
FIG. 8 is a graph showing the relationship between a printed matter density and a color data density when correction is made with a gradation corrector.

FIG. 8 is a view for explaining gradation correction carried out in the gradation corrector 10 wherein f0 represents a standard characteristic curve, f1 a high-light emphasis curve, f2 a shadow emphasis curve, f3 a high-light shadow emphasis curve and f4 an intermediate emphasis curve. As shown in this figure, by setting a tone reproduction characteristic for determining the relationship between density of color data and density of a printed material printed by the sublimation transfer printer 1 according to need, it is possible to reproduce tone similar to the original image. Namely, when no correction is made, the curve f0 is used. Further, when correction is made, an arbitrary one of curves f1 to f4 is suitably used in accordance with a portion to be emphasized. In addition, the tone reproduction characteristic curve is not limited to the curves shown. The gradation correction based on this tone reproduction characteristic is controlled by a gradation circuit (not shown). By adjusting trimmers (not shown) individually provided in regard of high-light, intermediate tone and shadow, the tone reproduction characteristic is set.

Then, data of Y, M, C and K corrected by the gradation corrector 10 are temporarily stored in the storage unit 11. The data stored in the storage unit 11 are read per each color using the select switch 12. After the data thus read are stored in the buffer 13 per each line of the transfer head 16, they are input to the P/S converter 14 as parallel data, with which they are converted into serial data.

The serial data thus obtained from the parallel data corresponding to n pixels is delivered to the shift register SR shown in FIG. 4. These pixel data are latched by the latched circuit LT and then are input to the NAND gates NA. When the strobe signal ST is input to the NAND gates, these pixel data are delivered to the heat elements HE, respectively.

Figure 9:
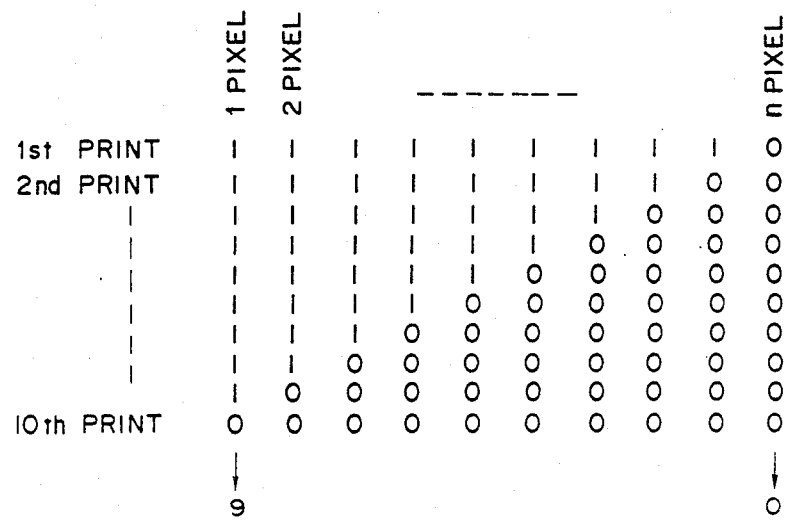
FIG. 9 is an explanatory view showing an example of a signal per each pixel delivered to the transfer head shown in FIG. 1.

FIG. 9 is an explanatory view showing signals per each pixel. The example shown indicates that the first pixel represents maximum gradation, the n-th pixel minimum gradation, and the second to the (n−1)-th pixel gradation linearly changing.

Then, the operation of the P/S converter 14 will be described. As shown in FIG. 3, the pixel data A as the parallel data (parallel data of 8 bits labeled A0 to A7) are delivered to the one input terminal of the comparator 22. To the other input terminal of the comparator 22, an output B (increment outputs of 8 bits labeled B0 to B7) is delivered. The counter 23 effects incremental count of a clock to sequentially vary outputs B0 to B7.

The comparator 22 makes a comparison between two inputs A and B, it continuously produces an output of logical "1" until the incremental output B of the counter 13 is equal to the pixel data A, i.e. when A>B and A=B and produces an output of logical "0" thereafter. Namely, until an incremental value of the counter 23 corresponding to weight of the density of the pixel data A is given, the comparator 22 continuously produces an output of logical "1". For instance, when the pixel data A has a density of 128 gradation in the 256 gradation, serial data comprising 128 logical "1" in succession and continuous 128 logical "0" subsequent thereto is obtained.

This serial data is produced as A≧B output obtained by fetching A>B and A=B outputs from the comparator 22 through an OR gate 24. In this example, 256 gradation is expressed. If necessary, the gradation can be reduced For instance, when the incremental bit is changed to B1 instead of B0, 128 gradation is obtained. Further, when the incremental bit is changed to B2, 64 gradation is obtained. The setting of the gradation can be easily changed.

In a manner stated above, by incrementing the output B of the counter 23 by one, it is possible to obtain serial data comprising a succession of logical "1" continuing until the relationship between the pixel data A and the output B of the counter 23 is represented by A=B and a succession of logical "0" thereafter. The serial data has been described in terms of comparison between FIGS. 4 and 9.

Figure 10:
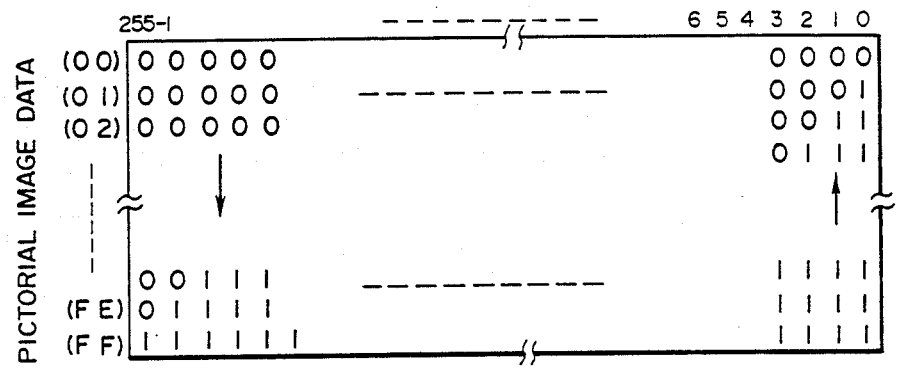
FIG. 10 is an explanatory view showing contents converted with another embodiment of a P/S converter shown in FIG. 1 as a matrix.

FIG. 10 shows contents to be converted with another embodiment of the P/S converter 14 as matrix. When image data is configured as parallel data having 8 bits as shown, the gradation data can be expressed as serial data comprising "00...00", and "11...11" representative of 0 to 255, respectively. As stated above, data stored in the buffer per each line of the transfer head 16 is delivered to the P/S converter 14 and then is converted into serial data. The serial data thus obtained is fed to the transfer head 16 through the driver 15 and then is recorded on the image-receiving paper P wound onto the transfer drum 17.

Figure 11:
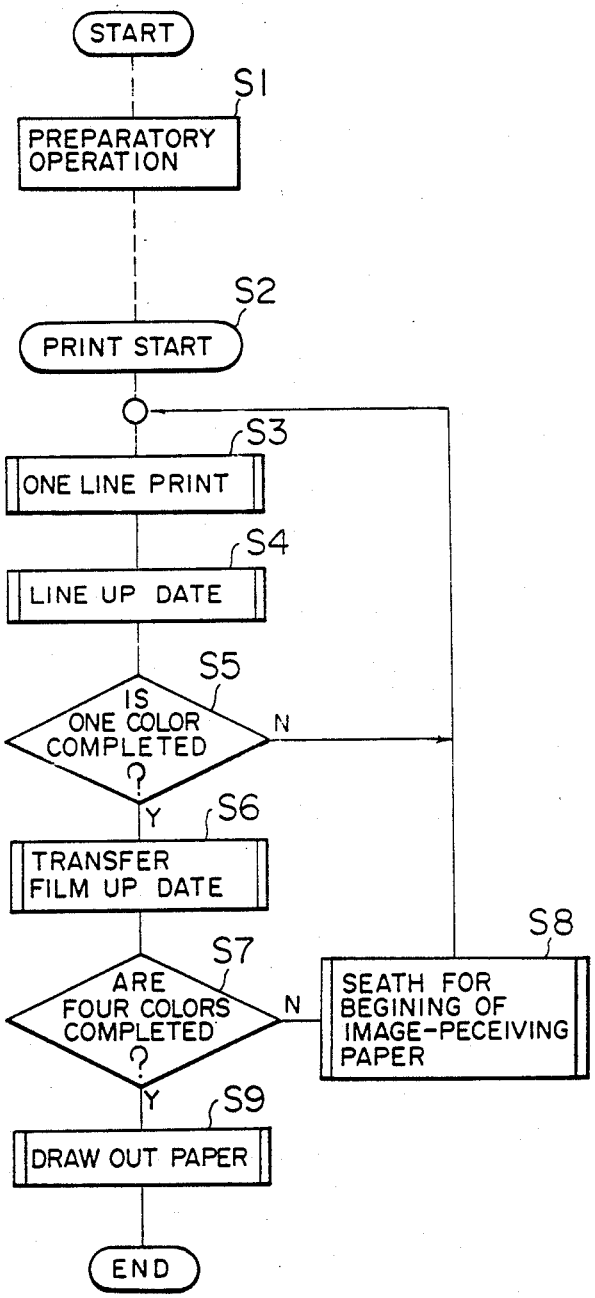
FIG. 11 is a flowchart showing the operation of the sublimation thermal transfer printer according to the present invention shown in FIG. 1.

FIG. 11 is a flowchart showing the operation of the sublimation transfer printer 1 according to the present invention.

First is to carry out a preparatory operation e.g. the setting of paper and search for beginning of a ribbon, etc. (step S1) to start printing operation (step S2). Thus, printing is carried out while updating the line one by one in regard of one of colors i.e. C (cyan), M (magenta), Y (yellow) and K (black) (steps S3 and S4). When the printing in regard of a particular single color is completed (step S5), an operation is carried out to replace it by a different color (step S6), thus continuing printing in regard of other three colors (step S6). Thus, printing is initiated from a predetermined position of the image-receiving paper in regard to each color (step S8). Upon completion of the printing of four colors, the image-receiving paper is drawn out (step S9). The operation of the sublimation transfer printer is thus completed.

As stated above, the sublimation transfer printer according to this embodiment makes a muddiness so as to meet the characteristic of a transfer ink or effects a conscious color control based on a selective correction with respect to a particular hue to correct gradation of data per each color according to need, thereafter to deliver the corrected data to realize desired printing. Accordingly, as compared to the conventional printer configured so as to simply drive a thermal head in accordance with input three primary color data, the printer of this embodiment makes it possible to extremely efficiently make a high precision and high quality color hard copy from various images.

Figure 12:
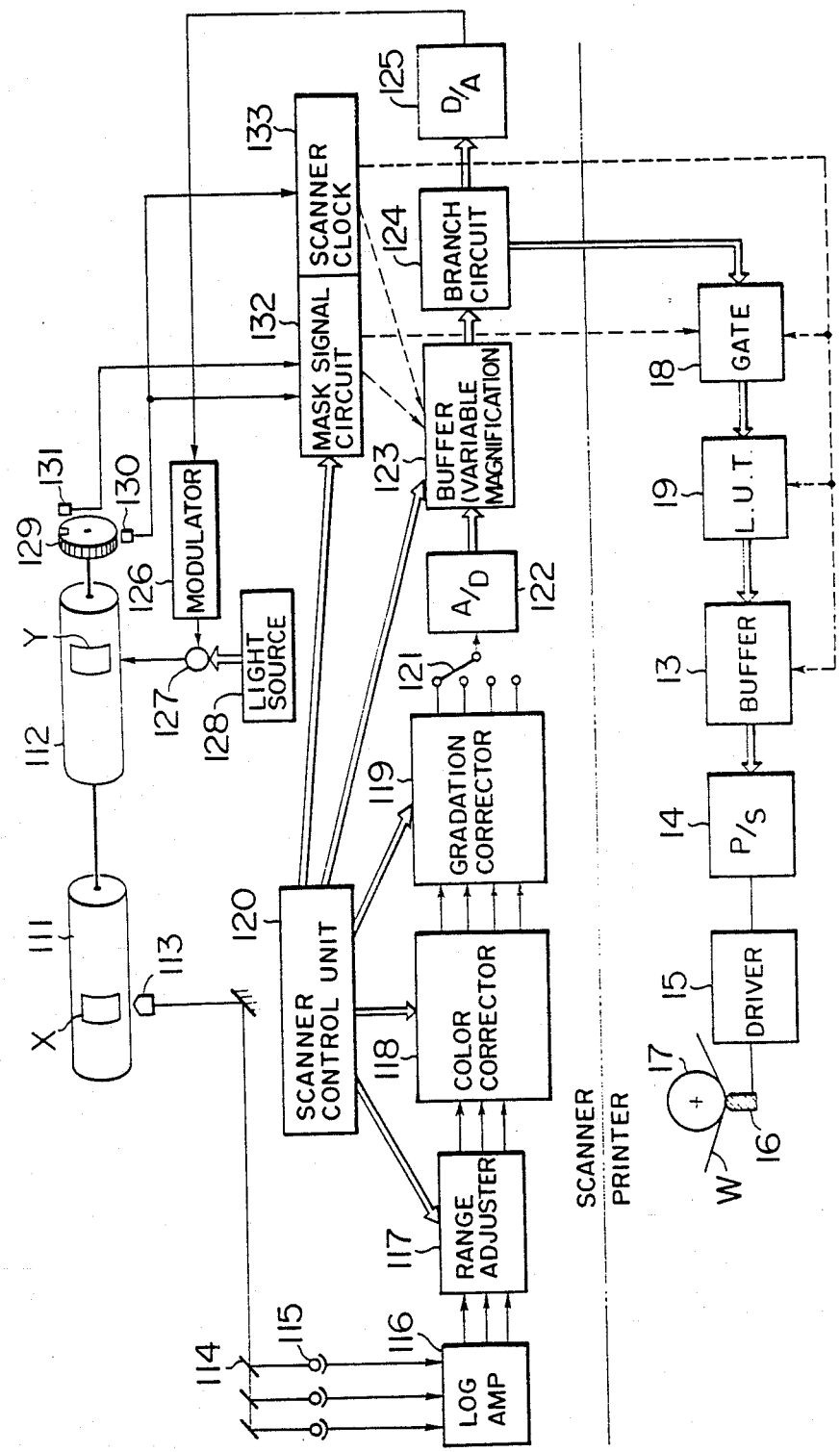
FIG. 12 is a block diagram illustrating another embodiment of a sublimation thermal transfer printer according to the present invention.

FIG. 12 is a block diagram illustrating another embodiment of a printer device according to the present invention. In this figure, there are shown a scanner to which the present invention is applied and a printer combined with the scanner by the present invention. The scanner includes a resolution drum 111 and an exposure drum wherein an exposure process is applied to a film Y on the exposure drum 112 on the basis of picture data taken out from a manuscript X on the resolution drum 111.

For taking out a picture light from the manuscript X on the resolution drum 111, a scanning head 113 is provided close to the resolution drum 111. The picture light taken out by the scanning head 113 undergoes spectroscopic processing by making use of a dichloic mirror 114. The light thus obtained is delivered to an optoelectric converter 115 to convert it into an electric signal. The electric signal thus obtained is delivered to a logarithmic amplifier 116. An output of the logarithmic amplifier 116 is delivered to a range adjuster 117, a color corrector 118 and a gradation corrector 119 in turn to make a correction of an electric signal in accordance with an operation command from a scanner control unit 120.

From the signal thus corrected, an electric signal of a necessary color is taken out by a board color select switch 121. Then, the electric signal is converted into a digital signal by an A/D converter 122. The digital signal thus obtained as picture data is stored in a buffer 123. For reading the picture data stored in the buffer 123, a magnification command from the scanner control unit 120, a mask signal from a mask signal circuit 132 and a clock signal from a scanner clock signal are delivered to the buffer 123. Namely, the buffer 123 reads an image having a magnitude corresponding to the magnification command in a range determined by the mask signal from the mask signal circuit 132. To the mask signal circuit 132, a pulse signal produced every time when the exposure drum 112 rotates by a predetermined angle and a pulse signal produced at every revolution of the exposure drum 112 are fed from pulse generators 130 and 131, respectively. In addition, to the scanner clock circuit 133, a pulse signal produced every time the exposure drum 112 rotates by a predetermined angle is fed from the pulse generator 130.

The pictorial image data read from the buffer 123 is delivered to a digital-to-analog (D/A) converter 125 through a branch circuit 124, thereby being converted into an analog signal. The analog signal thus obtained is delivered to a modulator 126, and is used for control of an optical modulator 217. Thus, a light from a light source 128 is controlled to expose the film Y on the exposure drum 112.

The output of the buffer 123 provided in the above-described scanner is branched by the branch circuit 124. The branch output is delivered to the printer referred to soon.

The printer responds to the pictorial image data delivered from the scanner through the branch circuit 124, the mask signal from the mask signal circuit 132 and the scanner clock signal from the scanner clock circuit 133 to effect various conversions necessary for forming a calibration print. To perform such conversions, a gate 18, a look-up table 19, and the buffer 13 and the P/S converter 14 which are identical to those shown in FIG. 1 are provided. The signal which has undergone P/S conversion is delivered to the transfer head 16 through the driver 15. Thus, dye on the transfer film W is sublimation-transferred onto an image-receiving paper on the transfer drum 17.

Figure 13:
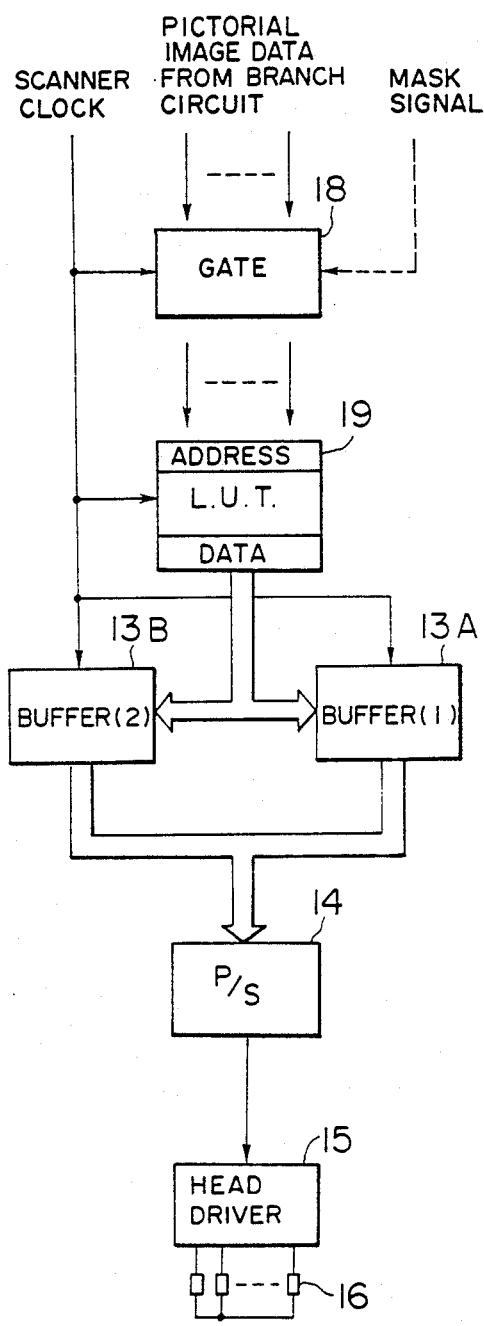
FIG. 13 is a block diagram illustrating a printer unit employed in the configuration shown in FIG. 12.

FIG. 13 is block diagram illustrating the circuit arrangement of the printer shown in FIG. 12. To the gate 18, the pictorial image data from the branch circuit 124, the scanner clock signal from the scanner clock circuit 133 and the mask signal from the mask signal circuit 132 are input. As a result, data which has undergone pixel density conversion 19 is read in synchronism with the scanner clock signal. The data thus read is delivered to buffer areas 13A and 13B constituting the buffer 13. These buffer areas 13A and 13B are accessed by turns in a manner that when data is written into one, data is read from the other. Such a buffer arrangement can prevent interference between write and read operations of the pictorial image data.

The data read from the buffer areas 13A and 13B is converted into serial data by the P/S converter 14 and then is delivered to the head driver 15. By applying such a P/S conversion to the parallel data from the buffer areas 13A and 13B, it is possible to deliver the pictorial image data to the transfer head 16 through the head driver 15 with the pictorial image data being undergone pixel density conversion with respect to a region determined by the mask signal in the pictorial data is output from the gate 18. Thus, data corresponding to resolution of the printer is obtained. This data is used for an address data of the look-up table 19. Namely, the gate 18 converts the pictorial data from the branch circuit 124 into the address data for conversion operation by the look-up table 19.

The look-up table 19 functions to form data indicative of gradation which can be reproduced in the printer in accordance with the address data delivered from the gate 18. In the look-up table 19, the address data and the gradation data are stored in advance in a manner that they correspond to each other. The look-up table 19 is read-out at a time synchronized with a scanner clock signal and the data read-out is given to buffer areas 13A and 13B which belong to buffer 13. These buffer areas are alternatively read and written like that when one of them is written, the other of them is read, so as to prevent interference between writing operation and reading operation.

Data read-out from buffer area 13A and 13B are converted into serial data and fed to a head driver 15. By this parallel/serial conversion, parallel data from buffer area 13A and 13B are able to be fed at a form of one line data of a transfer head 16. The transfer head 16 allows respective heat elements to be powered in accordance with drive signals from the head driver 15 to effect thermal transfer.

Figure 14:
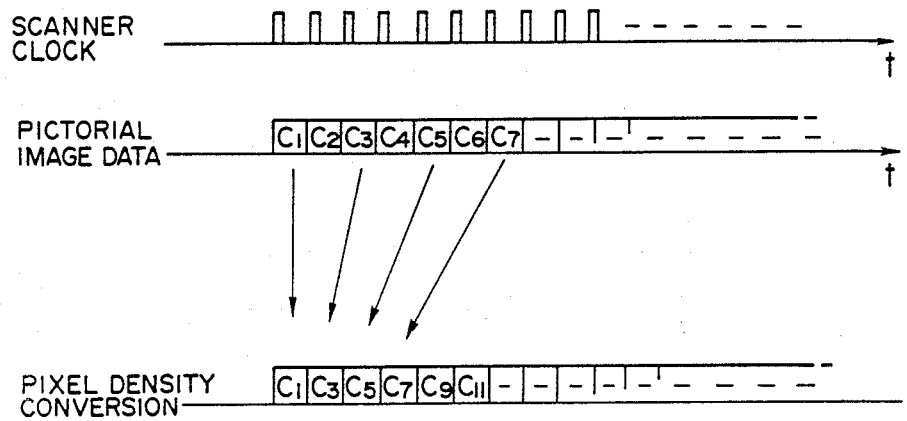
FIGS. 14 and 15 are timing charts of various signals of elements provided in the printer shown in FIG. 13.
Figure 15:
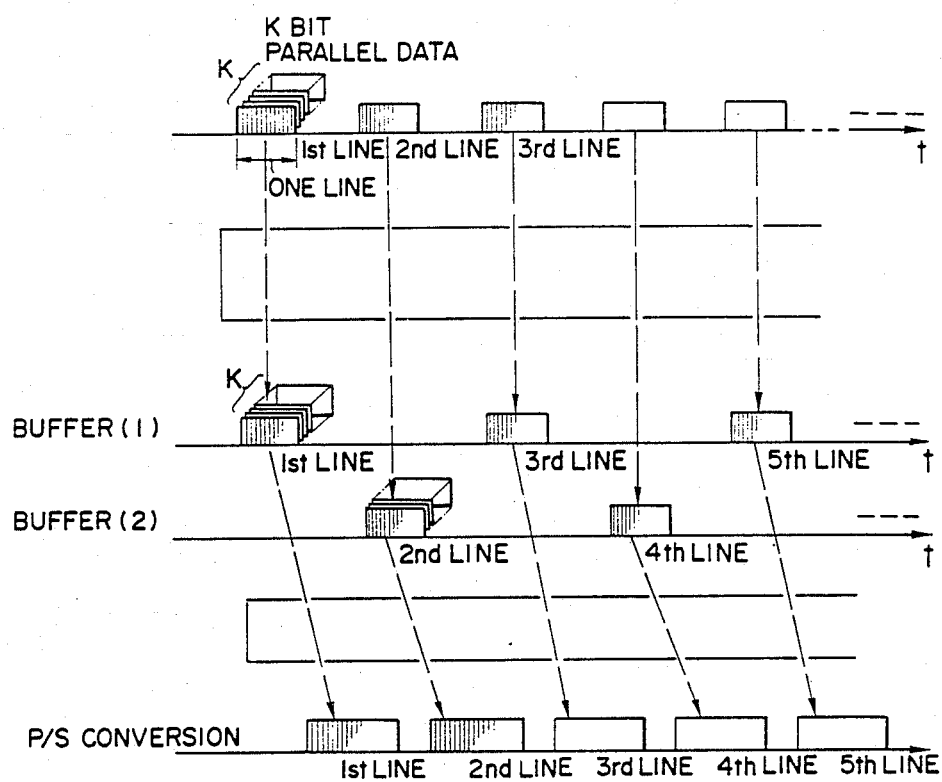

FIGS. 14 and 15 are timing charts showing various signals appearing on the circuit components of the printer shown in FIG. 13 wherein signals of the gate 18 and those of the buffer 13 and the P/S converter 14 are shown in FIGS. 14 and 15, respectively.

As shown in FIG. 14, the gate 18 applies thinning operation i.e. pixel-dropping operation to the pictorial image data. Namely, the gate 18 applies the pixel-dropping operation to the pictorial image data delivered from the branch circuit 124 in synchronism with the scanner clock signal with the mask signal (not shown) being as a mask command so that the pixel density of the pictorial image data is in conformity with a pixel density of the printer. It is seen that even pixels constituting the pictorial image data are all dropped in this example. After the pixel density conversion is thus carried out, the pictorial image data comprising odd pixels arranged in succession is obtained as shown. The pictorial image data thus obtained is delivered to the look-up table 19. This look-up table 19 employs a system of effecting gradation conversion with a gradation conversion table determined in advance. Since such a gradation conversion system is well known, its detailed explanation will be omitted.

The pictorial image data which has undergone the gradation conversion in the look-up table 19 is delivered to the two buffer areas 13A and 13B by turns as shown in FIG. 15. Then, each output from the buffer areas 13A and 13B is converted into serial data per each line by the P/S converter 14. The serial data thus obtained is delivered to the head driver 15.

Figure 16:
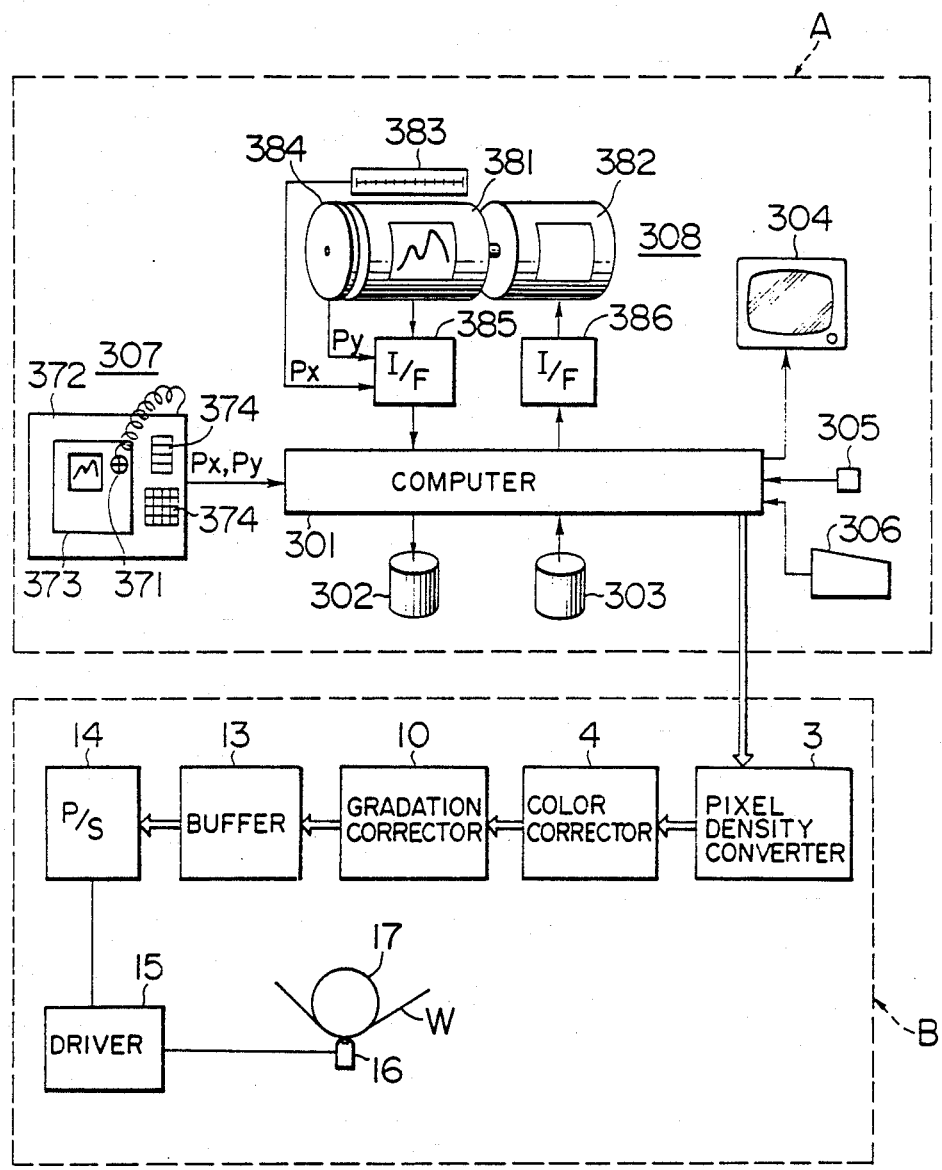
FIG. 16 is a block diagram schematically illustrating an embodiment of calibration print making device according to the present invention.

FIG. 16 is a block diagram illustrating an embodiment of a calibration print making device according to the present invention wherein the calibration print making device is constituted with a layout scanner A and a sublimation transfer printer B. As shown in this figure, the layout scanner A comprises a computer 301, and a memories 302 and 303, a display 304, a joy stick 305, a key board 306, a tablet digitizer 307 and a scanner unit 308 which are connected to the computer 301. On the other hand, the sublimation transfer printer B comprises the pixel density converter 3, the color corrector 4, the gradation corrector 10, the buffer 13, the P/S converter 14, the driver 15, the transfer head 16 and the transfer 17 which are identical to corresponding parts in the above-mentioned embodiments, respectively. The tablet digitizer 307 comprises a cursor 371 and an input surface 372. On the input surface, a sheet area 373 and a menu area 374 are provided The scanner unit 308 comprises an input drum 381, an output drum 382, a linear encoder 383, a rotary encoder 384, and interfaces 385 and 386 connected to the computer 301. The computer 301 employed in this embodiment comprises an input computer, a layout computer and an output computer which are not shown.

The pixel density converter 3 functions to effect thinning or interpolation of pictorial image data input from the computer 301 to apply pixel density conversion thereto so that a pictorial image of an arbitrary size is output from the transfer head 16. Ordinarily, the pixel density converter 3 effects pixel density conversion so that a pictorial image output to the output drum 382 of the layout scanner A has the same size as that output from the transfer head 16.

The color corrector 4 functions to correct color data Y (yellow), M (magenta), C (cyan) and K (black) corrected in conformity with the characteristic of a print ink in the layout scanner A so as to meet the characteristic of the transfer film W.

The gradation corrector 10 functions to correct gradation of data per each color of Y, M, C and K input from the color corrector 4 according to need. For this purpose, the gradation corrector 10 is provided with a gradation circuit (not shown), enabling emphasis of highlight or shadow.

The buffer 13 is provided with first and second buffers (not shown) for writing data corresponding one line of the transfer head 16 thereinto. These first and second buffers are accessed by turns in a manner that when data is written into one, data is read from the other, thus preventing interference between write and read operation of the pictorial image data.

Then, the operation of the print making device shown in FIG. 16 will be described. Initially, the operation of the layout scanner A will be referred to.

The layout scanner A carries out editing work, etc. of pictorial image data in accordance with various manuscripts, a layout designation sheet and other instruction sheets, etc. as follows. First is to stick a manuscript on the input drum 381 of the scanner unit 308 to input X-direction positional data from the linear encoder 383, Y-direction positional data from the rotary encoder 384, and pictorial image data of the manuscript to the input computer (not shown) of the computer 301 through the interface 385 to store them into the memory 302. The pictorial image data in respect of a suitable range of a manuscript based on the layout designation sheet (not shown) is input. The pictorial image data thus input will be subject to trimming by the layout computer (not shown) of the computer 301. The interface 385 employed in this embodiment has a corrective unction such as color correction and gradation correction, etc. By making use of a corrective function, correction processing suited to the characteristic of the print ink is applied to the input pictorial image data of the manuscript.

The memory 302 into which the pictorial image data which has undergone the correction processing is written is separated from the input computer and is connected to the layout computer. Thus, an image corresponding to the pictorial image data written in the memory 302 is displayed on the display 304. An operator observes the displayed image to operate the joy stick 305 while making reference to the layout designation sheet to move the cursor to designate a trimming range or the position of tint laying. In addition, the operator designates magnification factor, board surface color and halftone percentage, etc.

Since these data are written into the memory, when write operation of these data into the memory 303 is completed, the memory 303 is separated from the layout computer and is connected to the output computer (not shown) of the computer 301. Thus, the data stored in the memory 303 is output from the output computer. When making a film original board by making use of this data, an operation is carried out to output the data to the film set on the output drum of the scanner unit 308 through the interface 386.

The above-mentioned work carried out with the joy stick and the keyboard may be done by the operation of the tablet digitizer 307. To realize this, a method is employed to set the above-mentioned layout designation sheet in a sheet area of the tablet digitizer 307 to selectively input position data of a pictorial pattern described on the layout designation sheet and various menus set in the menu area 374.

The pictorial image data thus edited is input from the output computer to the sublimation transfer printer B per each line of the transfer head 16.

The operation of the sublimation transfer printer B will be described. Initially, when the pictorial image data corresponding to one line of the transfer head 16 is input from the layout scanner A to the pixel density converter 3, the pixel density converter 3 converts the pictorial image data into data having a pixel density of the sublimation transfer printer B to input the data thus obtained to the color corrector 4. The pictorial image data output from the scanner A ordinarily has a pixel density of about 12 to 20 lines/mm. Accordingly, since the pixel density thereof is higher than that of the sublimation transfer printer B, thinning processing is ordinarily carried out in the pixel density converter 3. It is preferable that the sublimation transfer printer B has a pixel density of more than 10 lines/mm.

Then, the data of Y, M, C and K corrected in the gradation corrector 10 are written into the buffer 13. Since the buffer 13 is constituted with first and second buffers (not shown) accessed by turns, the data read from the first and second buffers are input to the P/S converter 14 as parallel data, thus being converted into serial data.

Figure 17:
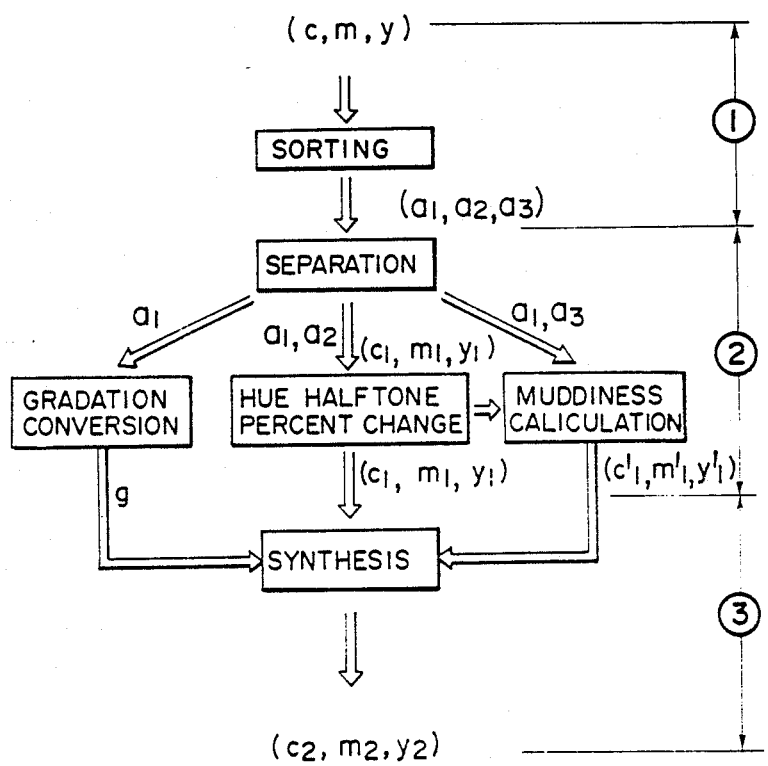
FIG. 17 is a diagrammatical view for explaining signal processing operations carried out with a color corrector and a gradation corrector shown in FIG. 16.

FIG. 17 is an explanatory view of the signal processing operation in another embodiment of the color corrector 4 and the gradation corrector 10 shown in FIG. 16. In this embodiment, color corrected data with respect to input pictorial image data is obtained by executing three processings described below:

(1) pre-processing of pictorial image data, (2) separation conversion processing three attribute data based on a signal which has undergone the pre-processing (pre-processed signal), and (3) synthesis processing of the three attribute data. It is now assumed that color data per each pixel of the pixel image data output from the pixel density converter 3 shown in FIG. 1 is represented by (c, m, y).

[Pre-processing 1]

In this processing, the magnitude of the color data (c, m, y) is normalized between 0 (low luminance) and 1 (high luminance). Namely, $$0 \leq c, m, y \leq 1.$$

Then, storing is applied to the color data (c, m, y) to arrange them in order to the value thereof to define data of the maximum value as a1, data of the intermediate value as a2, and data of the minimum value as a3.

In this instance, (a1, a2, a3) are called "preprocessed data".

[Separation conversion processing 2]

This processing comprises a separation conversion processing of hue data (c1, m1, y1) which advance in parallel on the basis of the pre-processed data (a1, a2, a3), a separation conversion processing of muddiness data (c1', m1', y1') and a separation conversion processing of gradation data g.

Initially, the separation conversion processing of the color data will be described. Factors for determining hue are determined as follows:

$I$ (a1−a3) and (a2−a3) when a2≠a3, and

II ($a_1-a_3$) when $a_2=a_3$.

The reason therefor is as follows. Namely, the data a3 when $a_2 \neq a_3$ and the data a2 and a3 when $a_2=a_3$ only function as muddiness components, but do not function as the factor for changing hue.

Figure 18:
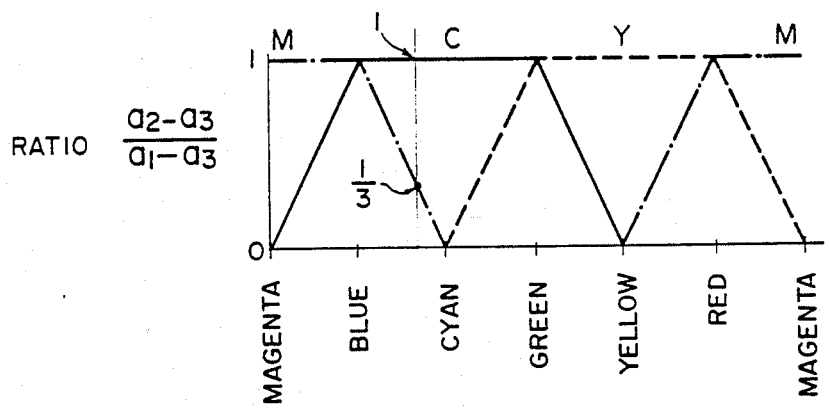
FIG. 18 is an explanatory view wherein hue is cyclically arranged in order of wavelength.

FIG. 18 is a view showing the relationship between a ratio of $(a_2-a_3)/(a_1-a_3)$ and hue arranged in order of wavelength. As seen from this figure, hue in the above-mentioned case I is given as a point immediately before one of color data (c, m, y) which is considered as the data a1 among points obtained by dividing a real number line into two segments on the hue curve as shown in FIG. 18 on the basis of a given ratio of $(a_2-a_3)/(a_1-a_3)$. Further, hue in the above-mentioned case II is given as a point where one of color data (c, m, y) which is considered as the data a1 is positioned.

For instance, when color data (c, m, y) is expressed as c=0.3, m=0.1 and y=0, relationships of a1=c=0.3, a2=m=−0.1 and a3=y=0 are obtained. In this case, since $a_2 \neq a_3$, $(a_2-a_3)/(a_1-a_3)=\frac{1}{2}$. Accordingly, a point represented by asterisk in FIG. 18 is obtained as the hue of the above-mentioned color data on the basis of the ratio of $(a_2-a_3)/(a_1-a_3)$ $(=\frac{1}{2})$ and the relationship of a1=c.

Figure 19:
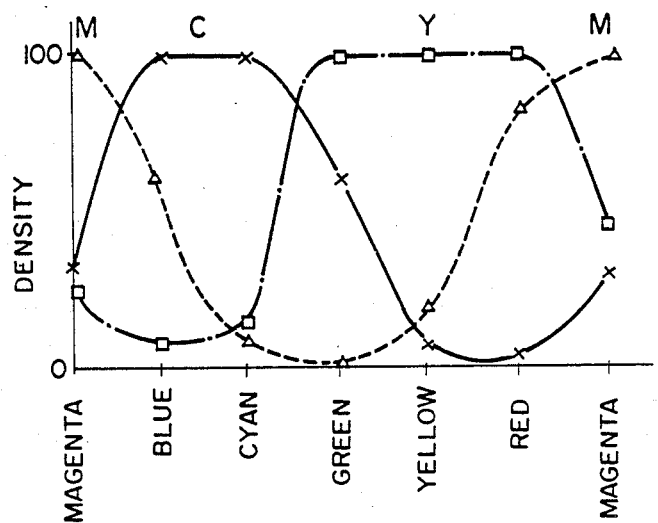
FIG. 19 is an explanatory view of a hue table showing ink density per each hue.

FIG. 19 is a graph showing a hue table wherein abscissa and ordinate represent hue in order of wavelength and an amount of a transfer ink (density) at the maximum gradation in respect of each hue, respectively. By making use of this hue table, conversion is executed with reference to the above-described hue position, thereby making it possible to hue data (c1, m1, y1) corresponding to the density at the time of the maximum gradation necessary for each color when a pictorial image is transferred from the transfer film W onto the image-receiving paper P.

Then, the separation conversion processing of muddiness data will be described. A muddiness quantity is expressed by a quantity of a complementary color included in a certain color. Accordingly, complementary color with respect to the input color data (c, m, y) is expressed as (1-c, 1-m, 1-y). When an operation is carried out to apply sorting to the complementary color thereafter to arrange colors thus sorted in order of value thereof, the relationship (a3, a2, a1) is obtained. Accordingly, a3/a1 is a rate of muddiness to be added to the hue data (c1, m1, y1). Then, a computation expressed as equation (1) for obtaining muddiness data is carried out using the hue data (c1, m1, y1) corresponding to the density at the time of maximum gradation necessary for each color obtained in the above-mentioned processing and the data 21 and 23.

$$(c_1', m_1', y_1') = (a_3/a_1) \cdot (1-c, 1-m, 1-y) \quad (1)$$

Thus, the muddiness data (c1′, m1′, y1′) is obtained.

Then, the separation conversion processing of gradation data will be described. It is first noted that gradation can be expressed by a value of the data a1 itself. This is because the color data (c, m, y) is normalized from the minimum value (=0) to the maximum value (=1) in the pre-processing 1 and the gradation of the hue necessarily becomes maximum when a1=1. Namely, gradation is given by a ratio of the data a1 to the maximum value of the data a1. In this instance, since the maximum value of the data a1 is equal to 1, the gradation becomes (a1/1)=a1.

Figure 20:
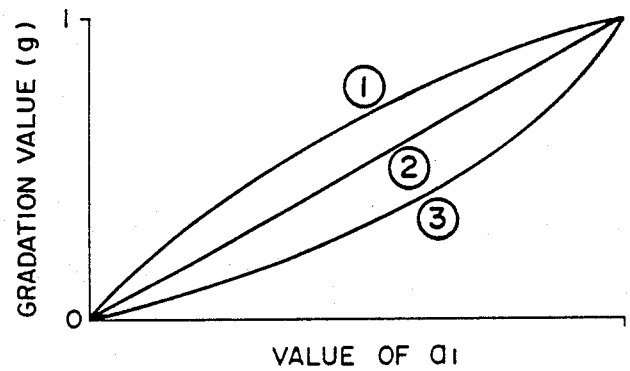
FIG. 20 shows a characteristic curve of a gradation conversion table used in the device shown in FIG. 16.

Then, a gradation conversion table as shown in FIG. 20 is prepared to determine gradation data g having a desired characteristic on the basis of the value of the data a1 by making reference to this gradation conversion table.

[Synthesis processing 3]

In this processing, density data c2, m2 and y2 necessary for each color except for the black data are calculated using the following equation (2):

$$\left. \begin{array}{l} c_2 = (c_1 + c_1') \times g, \\ m_2 = (m_1 + m_1') \times g, \text{ and} \\ y_2 = (y_1 + y_1') \times g. \end{array} \right\} \quad (2)$$

When transfer from the transfer film W to the image-receiving paper P is carried out using the density data thus obtained, it is possible to obtain a printed matter having a desired coloring i.e. a printed matter identical to one printed using a print ink. The correction work of each color is carried out as follows. The work for determining hue is to select a desired one from the characteristics of the hue table shown in FIG. 19. The work for determining muddiness is to adjust the value of a3/a1 shown in the above-mentioned equation (1) per each color. In addition, the work for determining gradation is to select a desired one from the characteristics of the gradation table shown in FIG. 20. These works are independent of each other and correspond to three attributes of color from an inspectual point of view. Accordingly, they can be extremely easily and precisely carried out.

As stated above, when the layout scanner is used to apply color correction and gradation correction to the pictorial image data laid out for making a printing plate so as to meet the characteristic of a transfer ink used, thereafter to effect transfer from the sublimation transfer sheet to the image-receiving paper, it is possible to obtain a calibration color hard copy directly using the sublimation transfer printer without making a film original board. The color hard copy thus obtained advantageously provides not only excellent gradation reproduction and resolution inherent in the sublimation transfer printer, but also the same high precision and high quality as those of an actual printed matter made using a printing board and a printing ink.

Figure 21:
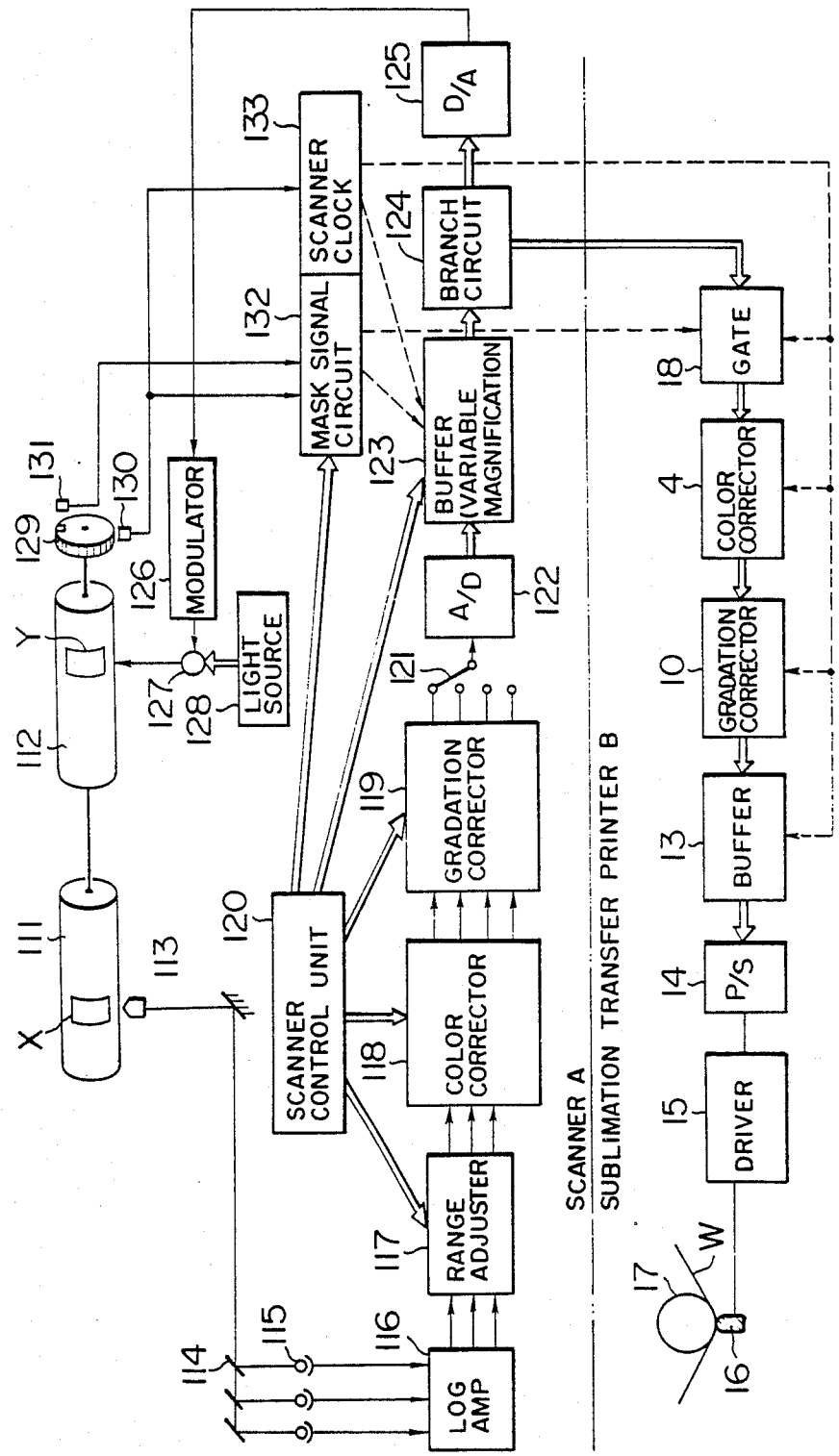
FIG. 21 is a block diagram schematically illustrating another embodiment of a calibration print making device according to the present invention.

FIG. 21 is a block diagram schematically illustrating another embodiment of a calibration print making device according to the present invention wherein this device is provided with scanner A and sublimation transfer printer B similar to those of the device shown in FIG. 12. As shown in this figure, the scanner A comprises resolution drum 111 for setting a manuscript X thereon, exposure drum 112 for outputting resolution image of the manuscript X, scanning head for taking out a light indicative of pictorial image, dichroic mirror 114, optoelectric converter 115 for converting the pictorial image light of R (red), G (green) and B (blue) into electric signals, logarithmic amplifier 116, range adjuster 117, color corrector 118 for converting electric signals of R, G and B into those of Y (yellow), M (magenta) and C (cyan) to apply correction thereto, and for creating K (black) data, gradation corrector 119, select switch 121, A/D converter 122, buffer 123, branch circuit 124, D/A converter 125, modulator 126, optical modulator 127, light source 128, a drum 129 rotatable coaxially with the exposure drum 112, pulse generator 130 producing a pulse signal every time the drum 129 rotates by a predetermined angle, pulse generator 131 producing a pulse signal per each revolution, mask signal circuit 132, scanner clock circuit 133, and scanner control unit 120 for effecting control of range adjustment, color correction and gradation correction, etc. On the other hand, the sublimation transfer printer B comprises gate 18, color corrector 4, gradation corrector 10, buffer 13, P/S converter 14, driver 15, transfer head 16, and transfer drum 17. The transfer head 16 is arranged in a manner to be in contact with the transfer drum 17 through the transfer film W.

Figure 22:
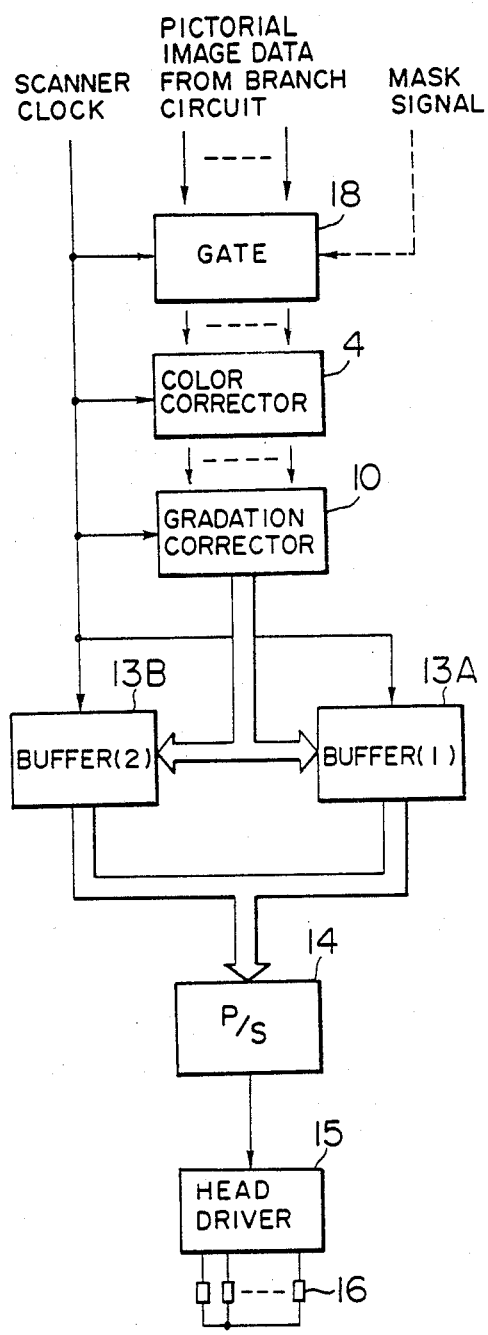
FIG. 22 is a block diagram illustrating a sublimation transfer printer used in the device shown in FIG. 21.

FIG. 22 is a block diagram illustrating the circuit configuration of the sublimation transfer printer B shown in FIG. 21. As shown in this figure, the gate 18 functions to input the pictorial image data from the branch circuit 124 to the sublimation printer B to convert the input data into data having a predetermined pixel density to output the data thus converted. The mask signal from the mask signal circuit 132 is delivered to the gate 18. The scanner clock signal from the scanner clock circuit 133 is delivered to the gate 18, color corrector 4, gradation corrector 10 and the buffer 13.

The color corrector 11 functions to correct color data of Y, M, C and K corrected in conformity with the characteristic of the printing ink in the layout scanner A so as to meet the characteristic of the transfer film W. The gradation corrector 10 functions to correct gradation of data per each color of Y, M, C and K input from the color corrector 11 according to need. The gradation corrector 10 is provided with a gradation circuit (not shown), etc., thus enabling emphasis of high-light or shadow.

The buffer 13 is provided for writing data corresponding to one line of the transfer head 16 thereinto, and is constituted with two buffers 13A and 13B. These buffers 13A and 13B are accessed by turns in a manner that when data is written into one, data is read from the other, thus preventing interference between write and read operations of the pictorial image data.

Then the operation of the calibration print making device shown in FIG. 21 will be described. Initially, operation of the scanner A will be referred to.

First is to set the manuscript X onto the resolution drum 111, thereafter to rotate the resolution drum 111 to input the pictorial image light of the manuscript X from the scanning head 113. Then, the pictorial image light undergoes spectroscopic processing by making use of the dichroic mirror 114. The light thus obtained is delivered to the optoelectric converter 115 to convert it into an electric signal. The electric signal thus obtained is delivered to the logarithmic amplifier 116. An output of the logarithmic amplifier 116 is delivered to the range adjuster 117, the color corrector 118 and the gradation corrector 119 in turn to make a correction of an electric signal in accordance with a control command from the scanner control unit 120. Namely, the color corrector 118 changes the electric signals of R, G and B which has undergone range adjustment into data of Y, M and C, thereafter to make color correction suited to the characteristic of the printing ink per each color and to create K data. In addition, the gradation corrector 119 corrects the gradation of the data of Y, M, C and K delivered from the color corrector 118 per each color.

From the signal thus corrected, an electric signal of a necessary color is taken out by the select switch 121. Then the electric signal is converted into a digital signal by the A/D converter 122. The digital signal thus obtained as pictorial image data is stored in the buffer 123. For reading the pictorial image data stored in the buffer 123, a magnification command from the scanner control unit 120, a mask signal from the mask signal circuit 132 and a clock signal from the scanner clock circuit 133 are delivered to the buffer 123. Namely, the buffer 123 reads a pictorial image having a magnitude corresponding to the magnification command within a range determined by the mask signal from the mask signal circuit 132. To the mask signal circuit 132, a pulse signal produced every time the exposure drum 112 rotates by a predetermined angle and a pulse signal produced per each revolution of the exposure drum are delivered from the pulse generators 130 and 131, respectively. In addition, to the scanner clock circuit 133, the pulse signal produced every time the exposure drum 112 rotates by a predetermined angle is delivered.

The pictorial image data read from the buffer 123 is input to the A/C converter 125 through the branch circuit 124, thereby being converted into an analog signal. The analog signal thus obtained is delivered to the modulator 126, and is used for control of the optical modulator 127. Thus, a light from the light source 128 is controlled by the optical modulator 127 to expose the film y on the exposure drum 112.

The output of the buffer 123 provided in the above-described scanner is branched by the branch circuit 124. The branch output is delivered to the sublimation transfer printer B.

Then, the operation of the sublimation transfer printer B will be described.

The sublimation transfer printer B responds to the pictorial image data delivered from the scanner A through the branch circuit 124, the mask signal from the mask signal circuit 132 and the scanner clock signal from the scanner clock circuit 133 to effect various conversions necessary for a calibration color hard copy.

First, to the gate 18, the pictorial image data from the branch circuit 124, the mask signal from the mask signal circuit 132 and the scanner clock signal from the scanner clock circuit 133 are delivered. The gate 18 outputs pictorial image data which has undergone pixel density conversion in respect of an area determined by the mask signal in the given pictorial image data. Thus, data corresponding to the resolution of the sublimation transfer printer B is obtained. This data is input to the color corrector 4. The pixel density of pictorial image data output from the scanner A is ordinarily about 12 to 20 lines/mm. Since this pixel density is higher than that of the sublimation transfer printer B, thinning processing is ordinarily carried out in the above-mentioned pixel density conversion. It is preferable that the pixel density of the sublimation transfer printer B is more than 10 lines/mm.

Then, data of Y, M, C and K corrected in the gradation corrector 10 are read in synchronism with the scanner clock signal. The data thus read are written into the buffer 13. The two buffers 13A and 13B provided in the buffer 13 effect read and write operation by turns. The switching of this operation is performed in synchronism with the scanner clock.

Then, the data read from the buffers 13A and 13B are input to the P/S converter 14 as parallel data, thereby being converted into serial data.

As stated above, the data stored in the buffer per each line of the transfer head 16 is delivered to the P/S converter 14, thereby being converted into serial data. The serial data thus obtained is delivered to the transfer head 16 through the driver 15, and then is recorded onto the image-receiving paper P on the transfer drum 17.

A timing chart of various signals appearing on respective circuit components of the sublimation transfer printer B shown in FIG. 22 is the same as that shown in FIGS. 14 and 15 wherein signals of the gate and those of the buffer 13 and the P/S converter 14 are shown in FIGS. 14 and 15, respectively.

Namely, the gate 18 responds to the mask signals (not shown), the scanner clock signal and the pictorial image data from the branch circuit 124 to apply thinning processing to the pixel data so as to meet the pixel density of the sublimation transfer printer B. Thus, the pixel data which has undergone the pixel density conversion is delivered to the color corrector 4.

As shown in FIG. 22, the data corrected in the color corrector 4 and the gradation corrector 10 are delivered to the two buffers 13A and 13B by turns. Then, the data read therefrom are converted into serial data per each line by the P/S converter 14. The serial data thus obtained is delivered to the head driver 15.

Figure 23:
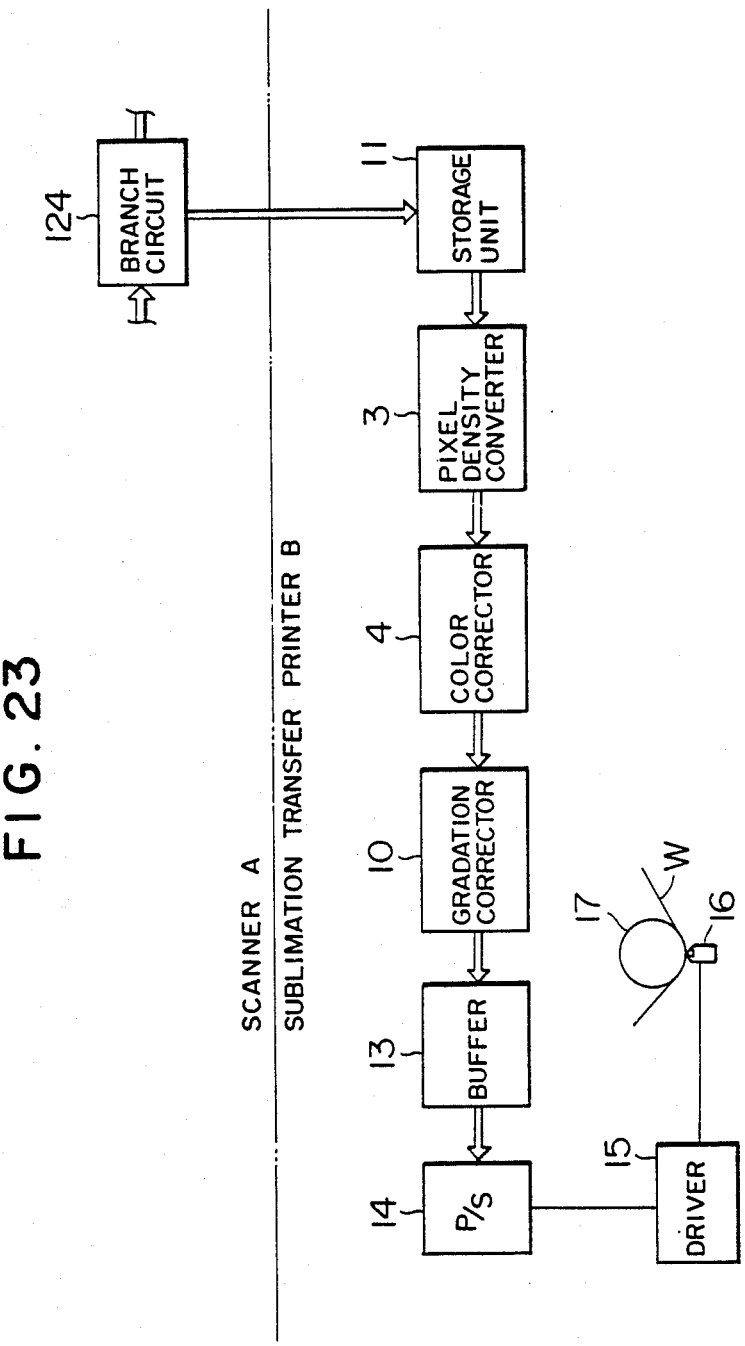
FIG. 23 is a block diagram illustrating another embodiment of the sublimation transfer printer shown in FIG. 22.

FIG. 23 is a block diagram illustrating another embodiment of the sublimation transfer printer B. As shown in this figure, the pictorial image data taken out from the scanner A through the branch circuit 124 is temporarily stored in the storage unit 11. From this storage unit 11, the pictorial data corresponding to one line of the transfer head 16 is input to the pixel density converter 3. The pixel density converter 3 functions to effect thinning or interpolation of the pictorial image data read from the storage unit 11 to carry out conversion of pixel density so that a pictorial image having an arbitrary magnitude is output from the transfer head 16. Ordinarily, the pixel density converter 3 effects pixel density conversion so that a pictorial image output to the exposure drum 112 of the scanner A has the same magnitude as that output from the transfer head 16. The color corrector 4, the gradation corrector 10, the buffer 13 and the P/S converter 14 have the same functions as those shown in FIG. 1. As previously described, they effect color and gradation corrections of the pictorial image data and the P/S conversion of the corrected data, respectively. Thus, a pictorial image identical to the one printed with a printing ink will be recorded on the image-receiving paper on the transfer drum 17.

The sublimation transfer printer B shown in FIG. 23 has employed a system of memorizing the pictorial image data once into the storage unit 11 thereafter to apply image processing to the pictorial image data read therefrom. The employment of such a system eliminates necessity of performing processings in the color corrector 4, the gradation corrector 10 and the buffer 13 in synchronism with the scanner clock signal from the scanner A, with the result that their processings can be independently carried out within the sublimation transfer printer B. Accordingly, this can facilitate the device configuration of the printer itself to effectively obtain a desired color hard copy.

As stated above, when color correction and gradation correction are applied to the pictorial image data which has undergone resolution processing by the scanner, thereafter to effect transfer from the sublimation transfer sheet to the image-receiving paper, it is possible to obtain a calibration color hard copy directly using the sublimation transfer printer without making the film original board. The color hard copies thus obtained provide not only excellent gradation reproduction and resolution inherent in the sublimation transfer printer, but also high precision and high resolution identical to those of actual printed materials made up using a printing board and a printing ink.

Figure 24:
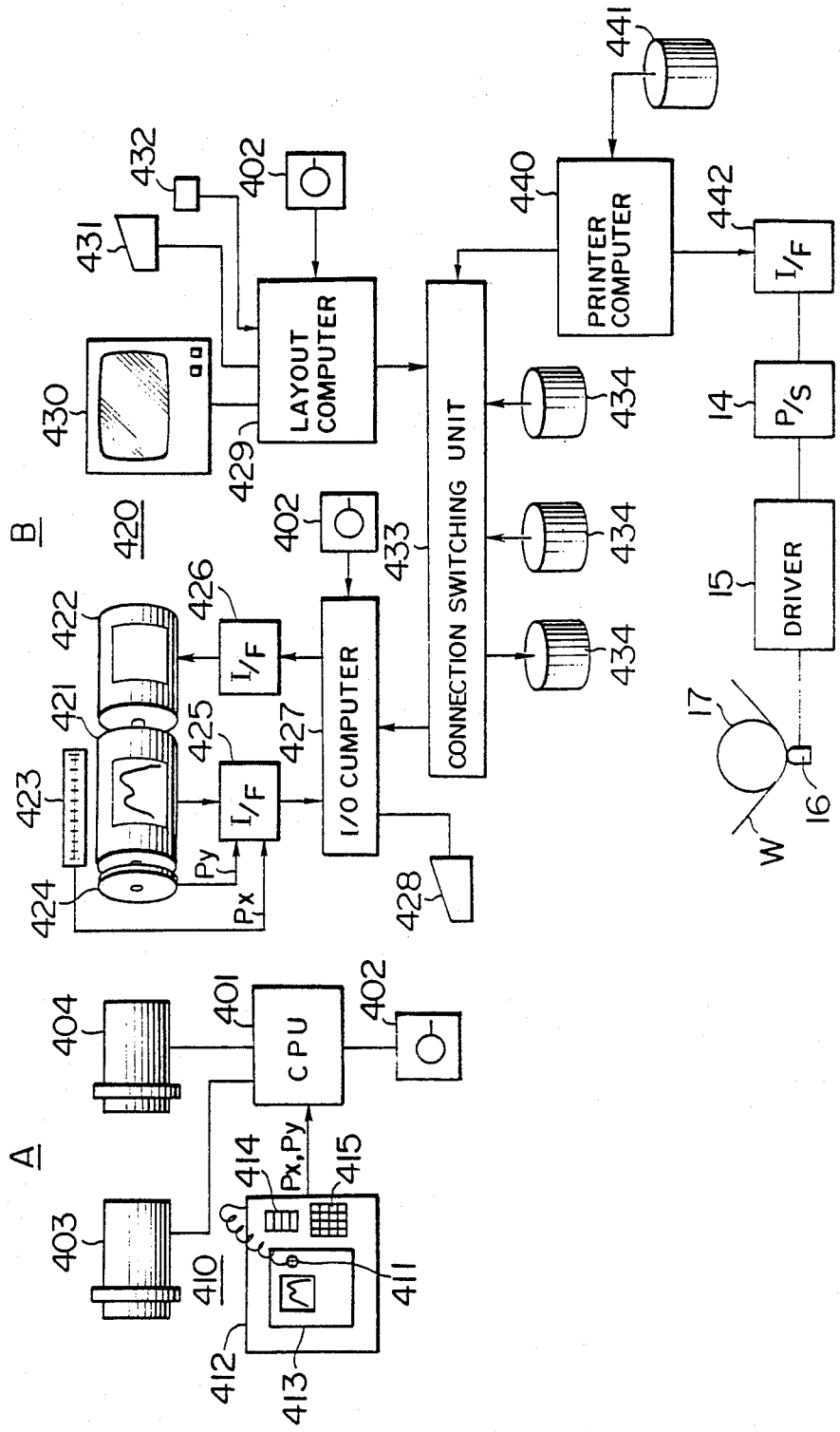
FIG. 24 is a block diagram schematically illustrating a further embodiment of a calibration print making device according to the present invention.

FIG. 24 is a block diagram illustrating a further embodiment of a calibration print making device according to the present invention. The device of this embodiment comprises a drawing device A, and a device for effecting trimming layout by utilizing the result obtained by the drawing operation in the drawing device.

The drawing device A comprises a tablet digitizer 410, a CPU 401 cooperative with the tablet digitizer 4, and other components. The tablet digitizer 410 comprises a cursor 411 and an input surface 412. On the input surface, a sheet area 413, a first menu area 414, and a second menu area 415 are provided. A floppy disk device 402, a plotter 403 and a mask cutter 404 are connected to the CPU 401.

The trimming layout device B comprises a scanner 420 including an input drum 421 and an output drum 422, interfaces 425 and 426, an input computer 427, a layout computer 429, a printer computer 440, a storage unit 434, and the floppy disk unit 402. On the input drum 421, a linear encoder 423 and a rotary encoder 424 connected to an interface 425 are arranged. To the input/output computer 427, the floppy disk device 402 and a key board 428 are connected. Further, to this computer 427 the input and output drums 421 and 422 are connected through the interfaces 425 and 426, respectively. To the layout computer 429, the floppy disk device 402, a display 430, a key board 431 and a mouse 432 are connected. To the printer computer 440, the storage unit 441 is connected. Further, to this computer 440, a sublimation transfer printer 450 is connected through an interface 442. Further, the input/output computer 427, the layout computer 429 and the printer computer 440 are connected to the storage units 434 through a connection switching unit 33. In addition, the sublimation transfer printer 450 comprises a P/S converter 451, a driver 452, a transfer head 453, and a transfer drum 454.

Then, the operation of the calibration print making apparatus shown in FIG. 24 will be described.

In the drawing apparatus A, various layout data including a trimming range, a picture pattern number, a board surface color, a stet color, a halftone percentage, and a variable magnification designated by a pictorial pattern described on a layout designation paper are created as follows.

First is to set the layout designation paper on the tablet digitizer 410. The layout designation paper corresponds to the sheet area 413 in FIG. 24 wherein the sheet area and the layout designation paper are denoted by reference numeral 413. On the layout designation paper 413, a ruled line indicating a range to be subject to trimming of the manuscript and a simple figure showing a contour line of the picture pattern are drawn.

Next is to input position data by placing the cursor 411 along the ruled line of the trimming range. In this instance, when the shape of the trimming range is one of several shapes determined in advance, e.g., a rectangle, the position data can be input with a simple method. Namely, when the trimming range is rectangular, a method can be employed to select "rectangle" of the first menu area 414 using the cursor 411 to input only two vertices of left and right upper corners in regard of the position.

After the trimming range is thus set, a specified point of the picture pattern e.g. the position of the eye in the case of human being is input using the cursor 411. A method may be employed to implement marking in advance to a point on the layout designation sheet corresponding to an easily recognized portion e.g. a corner of the manuscript or a corner of performance, etc., to use the point thus marked as a specified point.

Then, an input operation is conducted by making use of the second menu area 415. By using this menu area 415, data which can be utilized in the trimming layout apparatus B e.g. a manuscript number, a board surface color, a stet color, a halftone percentage of tint laying, and a variable magnification, etc. are input.

The data thus input using the tablet digitizer 410 is recorded on the floppy disk 402 through the CPU 401. This floppy disk 402 is loaded on the trimming layout apparatus B so that its recorded content will be utilized. Further, this recorded content is also delivered to the plotter 403 or the mask cutter 404 for use in taking of photograph of letter or print, etc.

Then, the operation of the trimming layout apparatus B will be described.

In the trimming layout device B, the computers 427 and 429 read data from the floppy disk 402 in which various layout data are recorded by the drawing device A to carry out layout processing as follows.

First is to set a manuscript on the input drum 421 of the scanner 420 to conduct an alignment operation so that an aiming of a magnifying glass or Lupe (not shown) and a specified point of the manuscript picture are equal to each other. At this time, position data output from the linear encoder 423 and the rotary encoder 424 represent coordinates of the specified point of the manuscript picture. Next is to operate the keyboard 428 to rotate the input drum 421, thus to input the pictorial image data of the manuscript to the computer 427 through the interface 425. The interface 425 employed in this embodiment has a correction function e.g. color correction and gradation correction etc. By making use of the correction function, correction processing is applied to the input pictorial image data of the manuscript so as to meet the characteristic of a printing ink.

The computer 427 reads ruled line information and specified point coordinates on the layout designation paper, and a specified point on the manuscript picture input on the input drum 421 from the floppy disk 402 to calculate a trimming area of the manuscript to store only the pictorial image data included in the trimming area into the storage unit 434. Thus, the pictorial image data corresponding to one page is stored in the storage unit 434. Then, the layout computer 429 reads the pictorial image data corresponding to one page from the storage unit 434 to carry out trimming layout processing on the basis of various layout data stored in the floppy disk 402. In this trimming layout processing, the entirety of the pictorial image data input by the computer 427 or a portion thereof is displayed on the display 430. Then, correction or alternation of the trimming range or layout is made by operating the keyboard 431 and the mouse 432. Thus, the pictorial image data corresponding to one page which has undergone final trimming layout processing will be stored in the storage unit 434 as output pictorial image data. Such input and output pictorial image data may be stored in the same storage unit or in a plurality of storage units.

A method of effecting trimming of pictorial image data is not limited to the above-mentioned method in which the computer 427 automatically performs trimming on the basis of position data of a specified point input on the input drum 421 and data stored in the floppy disk 402. Such a trimming may be carried out with various other methods. For instance, there may be employed a method wherein the input of position data of a specified point of the manuscript on the input drum is eliminated. According to this method, pictorial image data slightly larger in the magnitude than an actual trimming range is input to display the pictorial image data on the display 430 to effect final trimming by operating the mouse 432 on the display to input the position of a specified point of the display image.

Then, the storage unit 434 which has stored the output pictorial image data therein is connected to the input/output computer 427 by using the connection switching unit 433. The input/output computer 427 forms an image corresponding to one page on the film set on the output drum 422 through the interface 426. The connection switching unit 433 is a unit for switching connection between computers and the storage unit in response to a command from each computer.

In the above-mentioned embodiment, the same computer can be used for the computers 427 and 429. In addition, the storage unit illustrated as a single one in FIG. 24 can be constituted with a plurality of storage units e.g. fixed disks. Such a storage arrangement is suitable for handling image data having large quantity of data.

Then, the operation of the printer computer 440 and the sublimation transfer printer 450 will be described.

Figure 25:
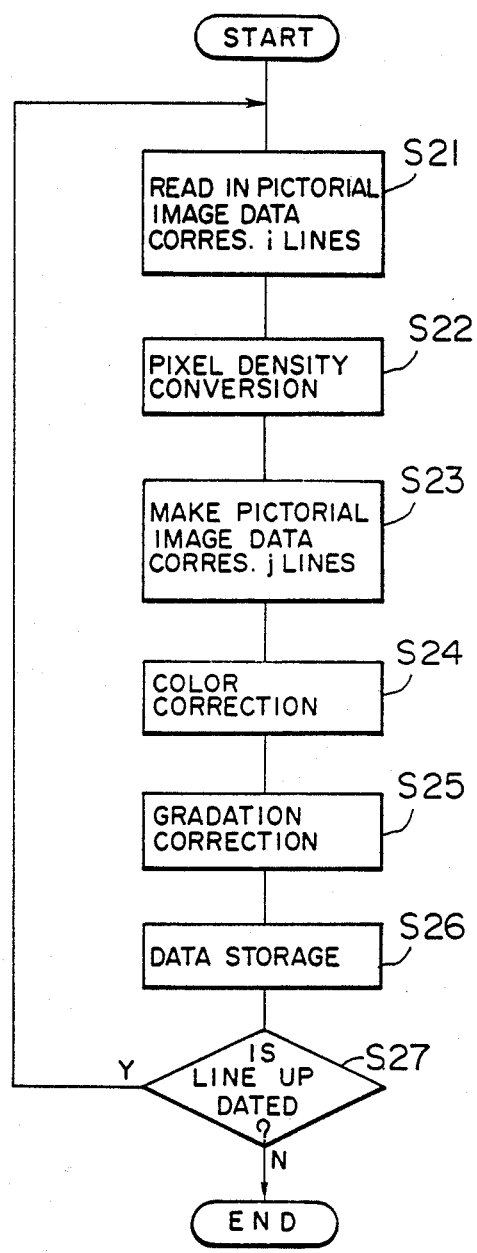
FIG. 25 is a flowchart showing a computational processing carried out with a computer in the device shown in FIG. 24.

FIG. 25 is a flowchart schematically showing processing contents of the computer 440.

First is to operate a keyboard (not shown) connected to the computer 440 to read pictorial image data corresponding to i lines stored in the storage unit 434 thereinto (step S21). The pictorial image data read into the computer 440 may be data to which trimming layout processing has been applied in the computer 429 or data input by the computer 427, which does not undergo trimming layout processing. Then, pixel density conversion is carried out (step S22) to make the pictorial image data corresponding to i lines (step S23).

By executing the pixel density conversion in the step S22, it is possible to output a pictorial image having an arbitrary magnitude from the transfer head 16. Ordinarily, a pictorial image having the same magnitude as that of the pictorial image to the output drum 422 of the scanner 420 is output from the transfer head 16. In addition, the pixel density of the pictorial image data output from the scanner 420 ordinarily has about 12 to 20 lines/mm. Accordingly, since this pixel density is higher than the pixel density of the sublimation transfer printer, thinning processing is ordinarily carried out in the pixel density conversion in the step S22.

Figure 26:
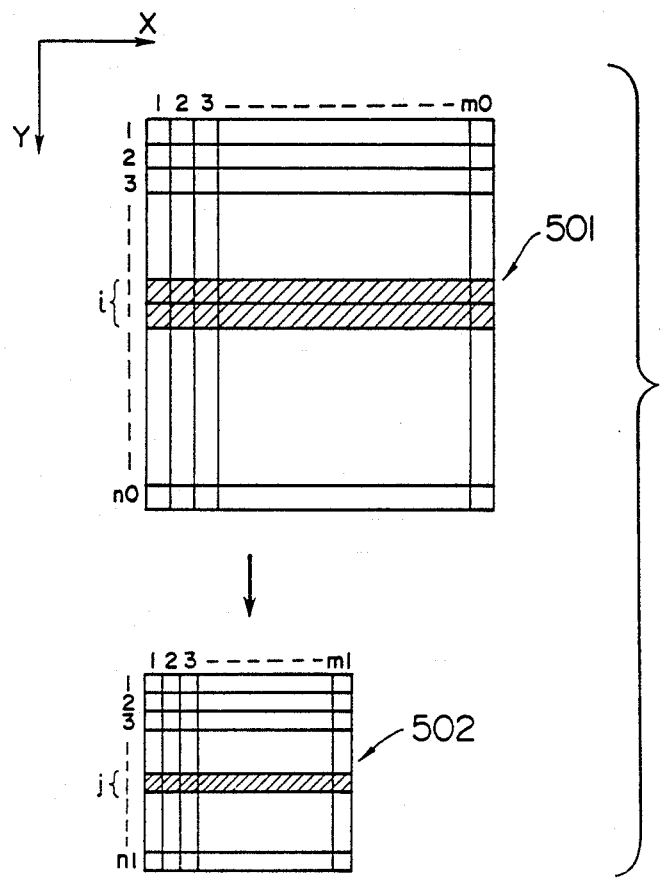
FIG. 26 is an explanatory view showing the behavior of changes in the image data when the computational processing shown in the flowchart of FIG. 25 is applied.

FIG. 26 is an explanatory view showing changes of the pictorial image data in the steps S21 to S23. In this figure, pictorial image data read from the storage unit 34 is designated at 501 by the computer 440, pictorial image data which has undergone pixel density conversion in the step S22 is designated at 502, and X-direction represents a line direction of read operation. As shown, the pictorial image data comprises (m0×n0) pixels. In the step S21, the pictorial image data corresponding to one line i.e. (m0×i) pixels are read to the computer 440. In the step S22, density conversion in X- and Y-directions is carried out (thinning processing is carried out in the figure). In the step S23, pictorial image data corresponding to j lines i.e. (m1×j) pixels is made. Thus, the pictorial image data 502 comprising (m1×n1) pixels is output from the transfer head 16.

Then, color correction is implemented to the pictorial image data corresponding to j lines made in the step S23 using a color corrector (not shown) provided in the computer 440 (step S23), which has a function similar to that of the color corrector 4 in FIG. 1. The pictorial image data read from the storage unit 434 is data of Y, M, C and K. In the color correction in the step S24, correction of data of Y, M and C is mainly carried out.

Then, each data of Y, M, C and K corresponding to j lines color-corrected in the step S24 undergoes correction of gradation using a gradation corrector (not shown) provided in the computer 440 (step S25), which has a function similar to that of the gradation corrector 10 in FIG. 1.

Subsequently, the pictorial image data corresponding to j lines which has undergone gradation correction in the step S25 is stored in the storage unit 441 (step S26). After line is updated (step S27), a series of processings shown in the steps S21 to S26 will be applied to pictorial data corresponding to the next i lines.

Then, the pictorial image data stored in the storage unit 441 is read through the interface 442 per each line of the transfer head 16. The data thus read is input to the P/S converter 14 of the sublimation transfer printer as parallel data, thereby being converted into serial data.

Thus, the data output from the interface 442 per each line of the transfer head 16 is delivered to the P/S converter 14, thereby being converted into serial data. The serial data thus obtained is delivered to the transfer head 16 through the driver 15, and then is recorded on the image-receiving paper on the transfer drum 17.

As stated above, first is to take out layout data for effecting layout of a pictorial image input by the scanner by making use of the layout designation paper set on the tablet digitizer to record the layout data thus obtained on a recording medium. Next is to load the recording medium on the layout computer. The employment of such a layout system eliminates the necessity of carrying out layout work using a display for a long time as in the commonly used layout scanners. In addition, when color correction and gradation correction are implemented pictorial image data which has been layed out for making a printing plate using the layout scanner in conformity with the characteristic of the transfer ink, thereafter to effect transfer from the sublimation transfer sheet to the image-receiving paper, it is possible to obtain a color hard copy for calibration directly using the sublimation transfer printer without making a film original board. The color hard copy thus obtained provides not only excellent gradation reproduction and resolution inherent in the sublimation transferprinter, but also the same high precision and high quality as actual printed materials made up using a printing board and a printing ink. As a result, this advantageously provides a greatly improved printing plate making efficiency by the layout scanner.

Figure 27:
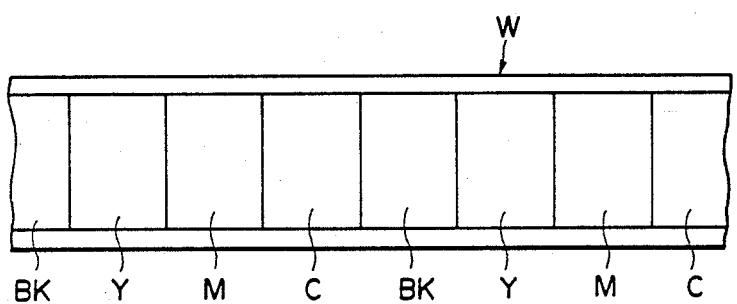
FIG. 27 is a schematic view showing a color pattern of a transfer ink in a transfer layer formed in a transfer film.

FIG. 27 shows a color of dye i.e. a color pattern of the transfer ink contained in the transfer layer provided in the transfer film W. As shown, transfer ink layers of four colors of Y, M, C and BK are provided in succession as a continuous pattern in the transfer film W.

Figure 28:
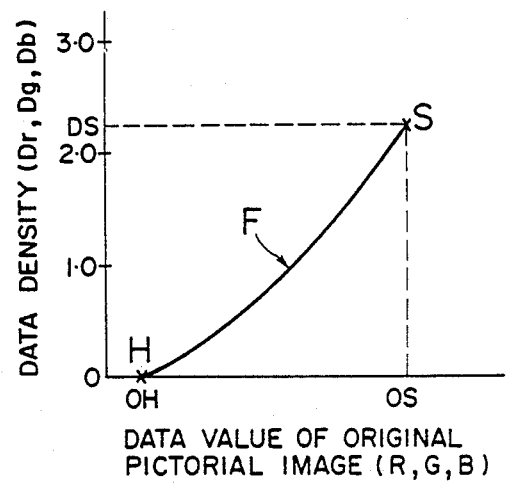
FIG. 28 is an explanatory view showing a method of converting RGB three primary color data into density data.

FIG. 28 is an explanatory view showing an example of a method for converting three primary color data of the original images of R, G and B into respective density data Dr, Dg and Db. In this figure, ordinate and abscissa represent values of density data to be converted and values of the original image data, respectively. It is now assumed that data value at a most bright portion of the original image (solid portion where any ink does not exist in the case of ordinarily making a hard copy of the original image) is represented by OH, data value at a most dark portion thereof (a portion showing a maximum density obtained by allowing the maximum densities of the three primary colors or more than three colors to overlap with each other) is represented by OS. A method is employed to use the density data value of OH as a reference density 0 to determine density data value DS of S buy allowing it to be in correspondence with a density value in each filter of R, G and B used for obtaining a color hard copy from the original pictorial image data in a range where the density data value DS of S is 1.0 to 3.0 (preferably, 1.4 to 2.3). By connecting two points H (OH, 0) and S (OS, DS) thus determined using a suitable curve, a conversion curve F is obtained. By making use of this conversion curve F, primary color data R, G and B of the original pictorial image are converted into density data Dr, Dg and Db, respectively. It is important to take into account the following points when determining a conversion curve.

(1) The conversion curve is determined by a try and error method so that an image reproduced as a color hard copy is sufficiently in correspondence with the original image in a visual sense.

(2) The conversion curve is determined from a principle aspect in regard of gradation reproduction. For instance, the conversion curve is determined by taking into account $\gamma$-characteristic when reproducing an image on a color Brown tube or gradation reproduction characteristic when reproducing an image by printing.

Next is to determine density data Cr, Mg, Yb and Bk of transfer inks C, M, Y and K forming a color hard copy of the original image on the basis of the density data Dr, Dg and Db obtained. In this instance, it is necessary to first determine the density data K of BK. An example of the determination method will be described.

First is to evaluate the minimum value Dmin of the above-mentioned density data Dr, Dg and Db using the following equation:

$$Dmin = MIN(Dr, Dg, Db).$$

Next is to determine the value of Dk on the basis of the minimum value Dmin.

Figure 29:
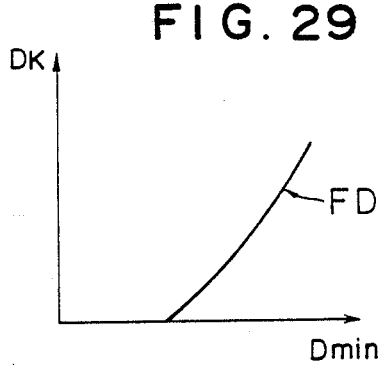
FIG. 29 shows a conversion characteristic view of density data.

FIG. 29 is an explanatory view showing an example of a method for evaluating the value of Dk with respect to the value of Dmin. In this figure, abscissa and ordinate represent values of Dmin and values of Dk, respectively. As shown the value of Dk with respect to Dmin can be determined by making use of the conversion curve FD. It is possible to employ the value of Dk thus obtained as density data K of BK (i.e. Dr=K). It is to be noted that the value of DK can be easily obtained as an electric signal using a known non-linear amplifier circuit.

After the density data K is thus determined, density data Cr, Mg and Yb of other transfer inks C, M and Y are determined in a manner stated below.

It is now assumed that respective filter densities of the above-mentioned R, G and B are defined below with respect to solid portions where respective transfer inks show the maximum densities:

Cr, Cg and Cb: Each filter density with respect to C,

Mr, Mg and Mb: Each filter density with respect to M,
Yr, Yg and Yb: Each filter density with respect to Y, and
Kr, Kg and Kb: Each filter density with respect to BK.

Thus, densities (which will be called "principal density" hereinafter) in a range of wavelength where there exist principal absorptions of the transfer ink C, M and Y are represented by Cr, Mg and Yb, respectively.

The ratios of the principal density to densities of other filters are expressed as follows:

$cg = Cg/Cr$, $cb = Cb/Cr$, $mr = Mr/Mg$, $mb = Mb/Mg$, and $yr = Yr/Yb$, $yg = Yg/Yb$.

In this instance, these ratios of cg, cb, mr, mb, yr and yg can be handled as approximately constants which are not dependent upon the principal density.

Since the above-mentioned density data Dr, Dg and Db become multicolor density obtained by adding respective filter densities of the transfer inks C, M, Y and BK, the following equations hold:

$$Dr = Cr + mr\ Mg + yr\ Yb + Kr \quad (1),$$

$$Dg = cg\ Cr + Mg + yg\ Yb + Kg \quad (2),\ and$$

$$Db = cb\ Cr + mb\ Mg + Yb + Kb \quad (3).$$

In addition, since the transfer ink BK has high density over an entire wavelength range, the following relationship holds:

$$Kr = Kg = Kb = K.$$

Accordingly, the above-mentioned equations (1) to (3) are expressed as follows:

$$Dr = Cr + mr\ Mg + yr\ Yb + K \quad (4),$$

$$Dg = cg\ Cr + Mg + yg\ Yb + K \quad (5),\ and$$

$$Db = cb\ Cr + mb\ Mg + Yb + K \quad (6).$$

On the other hand, since the density data K of BK is DK determined as shown in FIG. 29, the above-mentioned equations are expressed as follows:

$$Dr' = Dr - Dk = Cr + mr\ Mg + yr\ Yb \quad (7),$$

$$Dg' = Dg - Dk = cg\ Cr + Mg + yg\ Yb \quad (8),\ and$$

$$Db' = Db - Dk = cb\ Cr + mb\ Mg + Yb \quad (9).$$

Accordingly, solutions of the equations (7) to (9) are as follows:

$Cr = (1 - mb\ yg)/\Delta[Dr' + (mb\ yr - mr)/(1 - mb\ yg) \cdot Dg' + (yg\ mr - yr)/(1 - mb\ yg)Db']$, $Mg = (1 - yr\ cb)/\Delta[(cb\ yg - cg)/(1 - yr\ cb)Dr' + Dg' + (yr\ cg - yg)/(1 - yr\ cb)Db']$, and $Yb = (1 - cg\ mr)/\Delta[(cg\ mb - cb)/(1 - cg\ mr)Dr' + (mr\ cb - mb)/(1 - cg\ mr)Dg' + Db']$, where $\Delta = 1 - mb\ yg - cb\ yr - cg\ mr + cg\ mb\ yr + cb\ yg\ mr$, and $K = Dk$.

The above solutions are expressed using a matrix as follows:

$$\begin{bmatrix} Cb \\ Mg \\ Yr \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Dr' \\ Dg' \\ Db' \end{bmatrix}, \text{ and}$$

$$K = Dk$$

where $a_{ij}$ is a constant (i, j = 1 to 3).

Accordingly, it is possible to easily derive density data Cr, Mg, Yb and K of the transfer inks C, M, Y and BK from the density data Dr, Dg and Db using an electric circuit.

In the case where a color pictorial image signal from the image input device 2 is a composite color signal comprising a luminance signal and a color signal, it is possible to apply signal conversion to the composite color signal to convert it into three primary color data of R, G and B, thereafter to obtain the density data Cr, Mg, Yg and K using the above-mentioned method. In addition, it is also possible to directly determine the density data K of the transfer ink BK on the basis of the above-mentioned luminance signal to obtain density data Cr, Mg, Yb and K on the basis of the density data K and the above-mentioned color signals (given by R, G and B) using the above-mentioned method. Accordingly, such a method will be described.

In general, composite color signals of NTSC system, PAL system and SECAM system etc. classified according to the transmission system are known. The composite color signal of NTSC system employed in Japan or U. S. A. etc. will be described.

The NTSC system is adapted to convert a pictorial image signal given by the three primary colors of R, G and B into a luminance signal L and color signals I and Q to transmit signals thus converted.

When values of pictorial image signals R, G and B are represented by $E_R$, $E_G$ and $E_B$, values of $E_L$, $E_I$ and $E_Q$ of the luminance signal L and the color signals I and Q for transmission are converted using the following equation.

$$\begin{bmatrix} E_L \\ E_I \\ E_Q \end{bmatrix} = \begin{bmatrix} 0.30 & 0.59 & 0.11 \\ 0.60 & -0.28 & -0.32 \\ 0.21 & -0.52 & 0.31 \end{bmatrix} \begin{bmatrix} E_R \\ E_G \\ E_B \end{bmatrix}$$

As the receiving side, the signals $E_L$, $E_I$ and $E_Q$ thus converted is inversely converted to obtain the original color signals $E_R$, $E_G$ and $E_B$.

Figure 30:
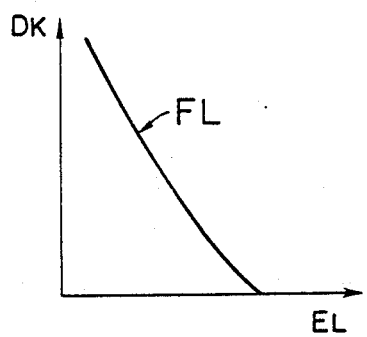
FIG. 30 shows a characteristic view for obtaining density data from luminance signal.

FIG. 30 is an explanatory view showing an example of a method for deriving density data K of the transfer ink BK directly from the value $E_L$ of the above-mentioned luminance signal. In this figure, abscissa and ordinate represent values of the luminance signal and value of the density data Dk, respectively. As shown, it is possible to determine the value of Dk with respect to the value of $E_L$ using a conversion curve FL. The conversion curve FL can be empirically or ideally determined in the same manner as the conversion curve F used for obtaining density data Dr, Dg and Db in FIG. 28.

By applying the value of Dk thus obtained and the primary color data obtained by inversely converting $E_L$, $E_I$ and $E_Q$ to the above-mentioned (1) to (9), the density data Cr, Mg, Yb and K are determined. Since the density data Cr, Mg, Yb and K are based on the density data K directly derived from the luminance signal $E_L$, it is possible to further increase reproduction accuracy of the original image.

FIG. 31(a) shows a portion of a head employed in an embodiment according to the present invention. Dots 604 each comprised of a heat element are square and are arranged in a column manner so that their diagonal lines are in parallel with a rotational direction X. To each dot 604, electrode layers 605 and 606 are connected. By applying a voltage between both electrodes, each heat element is heated.

The above-mentioned embodiment is advantageous in that the arrangement of dots 604 is extremely simplified, but has the drawback that dot spacing when a slanting line is printed is unnecessarily expanded. Accordingly, from a practical point of view, as shown in FIG. 31(b), it is preferable to arrange square dots in two columns along the rotational direction X and to shift the arrangement in the lower column relative to the arrangement in the upper column by half-pitch. In this instance, the electrode layers 607 and 608 serve as electrodes for application of voltage with respect to dots 604 of the upper column and those of the lower column, respectively. A common electrode layer 609 is used for opposite electrodes with respect to all the dots 604. The employment of such a configuration can carry out printing at a dot position arranged with a predetermined pitch and as a dot position shifted by half-pitch with respect to the former dot position. Accordingly, when a slanting line is printed using the head according to this embodiment, a smooth line property free from offset is realized as shown in FIG. 34(b). On the other hand, longitudinal and lateral lines are printed, a line property having offset is obtained.

By comparing FIGS. 33(a) and 33(b) with FIGS. 34(a) and 34(b), it is possible to clearly recognize the difference between the printed result obtained with a conventional head and that obtained with the head according to the present invention. Namely, in the case of the conventional head, offsets occur when a slanting line is printed. In contrast, in the case of the head according to the present invention offsets occur when longitudinal and lateral lines are printed. Both the cases can be said as the same in that an offset occurs in either the slanting line or the longitudinal and lateral lines. However, when a printed result is viewed by the eye, the offset is remarkably conspicuous in the slanting line than in the longitudinal and lateral lines on the basis of human technological and psychological main causes. Accordingly, the offset shown in FIG. 33(b) is more conspicuous than that shown in FIG. 34(a), and the former gives non-smoothed impression. After all, the printed result obtained with the head according to the present invention gives the impression that the entire line property is uniform, resulting in a completed image.

FIG. 31(c) shows an example wherein square dots 604 are arranged on a straight line which forms 45° with respect to the rotational direction X. The employment of such an arrangement enables printing to a position shifted by half-pitch without arranging dots 604 in two columns.

FIG. 31(a) shows an example of an arrangement obtained by dividing the arrangement shown in FIG. 31(c) into a plurality of groups. In the case of a line printer, it is required to arrange dots by a certain width along the rotational direction. However, when the arrangement as shown in FIG. 31(c) is employed to arrange dots in the X-direction, a considerable width is occupied also in the Y-direction, with the result that the size of the entire head becomes large to a considerable extent. In contrast, the arrangement shown in FIG. 31(d) can extend the width in the X-direction with the width in the Y-direction being limited to a predetermined width.

In the above-mentioned embodiments, reference has been made to the example wherein the present invention is applied to a head for thermal printer. Further, the present invention is applicable to a printer head of the dot impact system in the same manner as stated above. In addition, by employing an arrangement comprising the conventional dots 601 as shown in FIG. 32 constituting the upper column and the dots 604 according to the present invention shown in FIG. 31(a) constituting the lower column to selectively use the upper column for printing longitudinal and lateral lines and the lower column for printing slanting lines, either line can be smoothly printed.

As long as the shape of a dot employed in the present invention is a rhomb i.e. a square having opposite sides in parallel and respective four sides of the same length, any square dot may be used. However, it is most preferable from a practical point of view that a dot used is regularly square. When the dot has rhombic shape other than regularly square, since an angle formed by one pair of adjacent sides is acute, while an angle formed by the other pair is obtuse, the following drawbacks occur.

(i) There occurs difference of resolution between longitudinal and lateral lines.

(ii) When portions of an acute angle are aligned, an offset becomes large, resulting in an extremely lowered linearity.

(iii) There occurs a difference between the thickness of a longitudinal line and that of a lateral line.

(iv) Manufacturing process becomes difficult. For instance, when a pattern print is implemented using a light-shielding mask, a light is locally spotted at a portion of the acute angle, failing to form a precise rhombic pattern.

What is claimed is:

1. A sublimation transfer printer comprising:
   (a) a color corrector for correcting respective data indicative of three primary colors of an input color pictorial image in conformity with a characteristic of a transfer ink, and for creating black data;
   (b) a gradation corrector for correcting gradation of respective color data output from said color corrector;
   (c) a storage unit for storing respective color data output from said gradation corrector;
   (d) a parallel-to-serial converter having a buffer to which pixel data is input, a counter to which a clock signal is input and a comparator to which two multi-bit outputs of said buffer and said counter are input, whereby said comparator compares said two multi-bit outputs to produce a serial data, for converting data read per each color from said storage unit into serial data; and
   (e) a printing unit responsive to an output of said parallel-to-serial converter to effect a transfer from a sublimation transfer sheet to an image-receiving paper.

2. A calibration print making apparatus comprising:
   (a) a layout data making device for recording various layout data including a trimming range, a picture pattern number, a board surface color, a stet color, a halftone percentage, and a variable magnification on a recording medium;

(b) a scanner having an input drum, an output drum and a data processing circuit, for processing pictorial image data input from said input drum so as to obtain a color separated image on said output drum;

(c) a first computational control device having a first storage unit and a second storage unit, for layout functioning to store pictorial image data of various manuscripts input by said scanner into said first storage unit, thereafter to read pictorial image data from said first storage unit to effect layout of pictorial image data for making a printing plate on the basis of various layout data read from said recording medium to store the pictorial image data laid out into said second storage unit to read said pictorial image data laid out from said second storage unit, thus to output a color separated output to said output drum of said scanner;

(d) a second computational control device for printer functioning to read a portion of the entirety of said pictorial image data stored in said first or second storage unit therein to convert it into data having a predetermined pixel density to carry out color and gradation corrections per each color in conformity with a characteristic of transfer ink, thereafter to output said pictorial image data read thereinto; and (e) a printing unit having a converting unit and a transfer printing unit, for converting data input from said computational control devices into parallel data by said converting unit, thereafter to drive a transfer head on the basis of said parallel data from said converting unit, thus to effect a transfer from a sublimation transfer sheet to an image-receiving sheet.

3. A calibration print making apparatus as set forth in claim 2, wherein said printing unit comprises a printer provided with a head for a dot printer having rhombic dots of which diagonal lines are arranged in parallel to a rotational direction of said output drum.

4. A calibration print making apparatus provided with a head for a dot printer as set forth in claim 3, wherein said rhombic shape is a regular square.

5. A calibration print making apparatus provided with a head for a dot printer as set forth in claim 4, wherein rhombic dots are arranged in two columns along said rotational direction, the arrangement of the lower column being shifted by half-pitch with respect to the arrangement of upper column.

6. A calibration print making apparatus provided with a head for a dot printer as set forth in claim 4, wherein regularly square dots are arranged on a straight line which forms an angle of 45 degrees with respect to said rotational direction.

7. A calibration print making apparatus provided with a head for a dot printer as set forth in claim 3, wherein rhombic dots are arranged in two columns along said rotational direction, the arrangement of the lower column being shifted by half-pitch with respect to the arrangement of the upper column.

8. A calibration print making apparatus provided with a head for a dot printer as set forth in claim 3, wherein each dot is comprised of a heat element.

* * * * *